US012565335B2

(12) United States Patent (10) Patent No.: US 12,565,335 B2
Roberson (45) Date of Patent: Mar. 3, 2026

(54) DETERMINING PART UTILIZATION BY MACHINES

(71) Applicant: The Boeing Company, Arlington, VA (US)

(72) Inventor: Daniel Richard Roberson, Marysville, WA (US)

(73) Assignee: The Boeing Company, Arlington, VA (US)

( * ) Notice: Subject to any disclaimer, the term of this patent is extended or adjusted under 35 U.S.C. 154(b) by 251 days.

(21) Appl. No.: 18/179,810

(22) Filed: Mar. 7, 2023

(65) Prior Publication Data

US 2024/0300670 A1 Sep. 12, 2024

(51) Int. Cl.
*G06Q 30/00* (2023.01)
*B64F 5/60* (2017.01)
(52) U.S. Cl.
CPC ..................................... *B64F 5/60* (2017.01)
(58) Field of Classification Search
None
See application file for complete search history.

(56) References Cited

U.S. PATENT DOCUMENTS

| | | | | |
|---|---|---|---|---|
| 2012/0079407 | A1* | 3/2012 | Holmes | G05B 23/0216 |
| | | | | 715/772 |
| 2017/0068252 | A1* | 3/2017 | Yu | G05D 1/0858 |
| 2020/0033849 | A1* | 1/2020 | Yiu | H04W 76/27 |
| 2024/0340729 | A1* | 10/2024 | Selvaganapathy | |
| | | | | H04W 36/00838 |

FOREIGN PATENT DOCUMENTS

| | | | | |
|---|---|---|---|---|
| EP | 3291149 A1 * | 3/2018 | ............. | G06Q 10/20 |

OTHER PUBLICATIONS

A coaxial alignment method for large aircraft component assembly using distributed monocular vision. By: Deng, Zhengping; Li, Shuanggao; Zeng, Qi; +1 more, In: Assembly Automation, 2018, Engineering Source. (Year: 2018).*
Informed machine learning-based machining parameter planning for aircraft structural parts. By: Deng, Tianchi; Li, Yingguang; Chen, Jiarui; +2 more, In: International Journal of Advanced Manufacturing Technology, Dec. 2021. (Year: 2021).*
European Patent Office, Extended European Search Report Issued in Application No. 2416105.0, Aug. 12, 2024, Germany, 7 pages.

* cited by examiner

*Primary Examiner* — Matthew T Sittner
(74) *Attorney, Agent, or Firm* — Alleman Hall LLP

(57) ABSTRACT

A computing system and method for determining part utilization by machines, such as aeronautical vehicles, are disclosed. According to an example, a first data set is obtained that identifies a physical parameter defining a configuration of a first population of aeronautical vehicles and a part applicability of an identified part for the first population. A second data set is obtained that identifies a physical parameter defining a configuration of a second population of aeronautical vehicles that differs from the physical parameter of the first population. An inferred part applicability is determined for the second population that describes a probability that the identified part is utilized by the second population. A part utilization value is output that identifies a measurement of part utilization of the identified part for the second population that is based on the inferred part applicability.

20 Claims, 9 Drawing Sheets

Figure 4A:
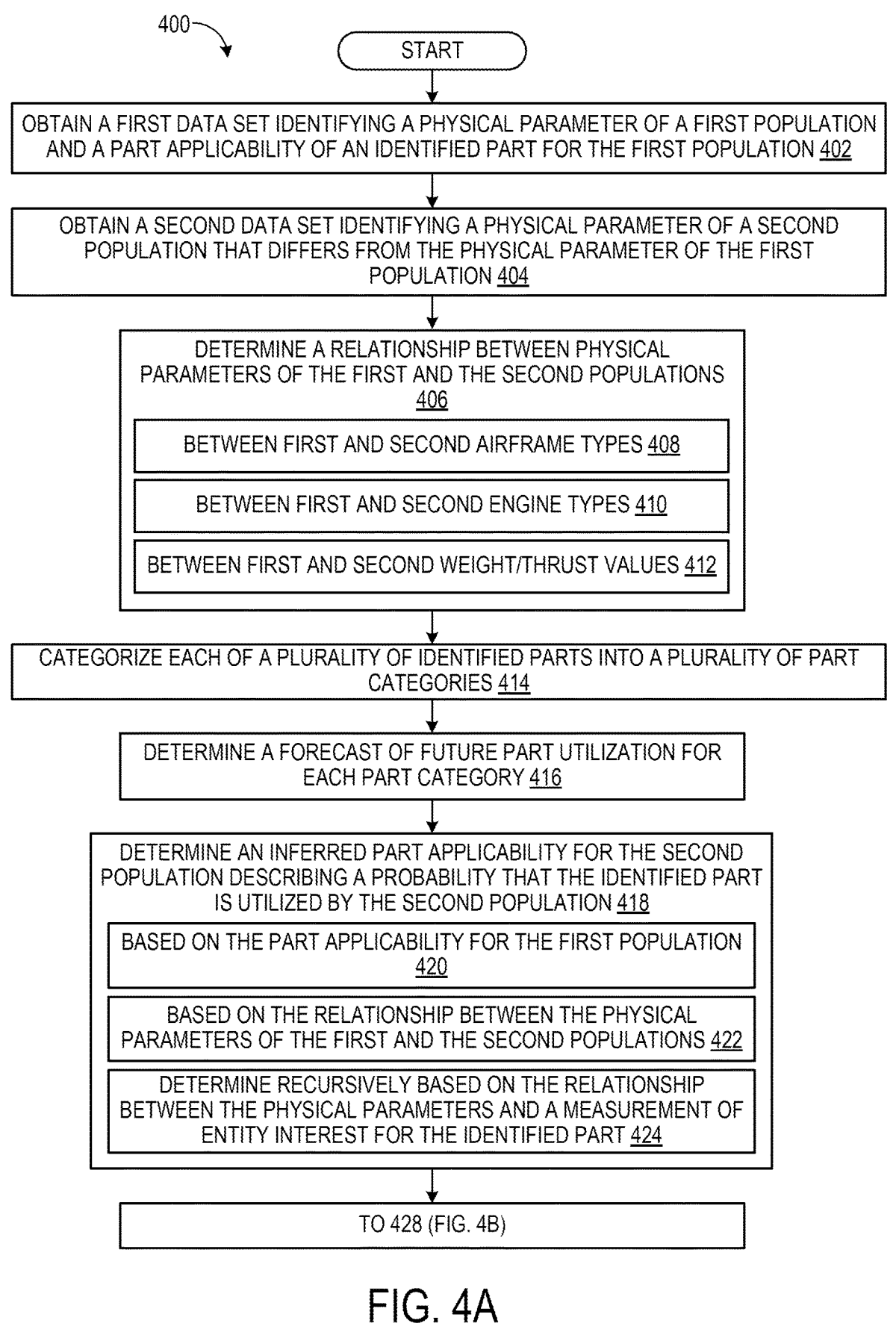

400

START

OBTAIN A FIRST DATA SET IDENTIFYING A PHYSICAL PARAMETER OF A FIRST POPULATION AND A PART APPLICABILITY OF AN IDENTIFIED PART FOR THE FIRST POPULATION 402

OBTAIN A SECOND DATA SET IDENTIFYING A PHYSICAL PARAMETER OF A SECOND POPULATION THAT DIFFERS FROM THE PHYSICAL PARAMETER OF THE FIRST POPULATION 404

DETERMINE A RELATIONSHIP BETWEEN PHYSICAL PARAMETERS OF THE FIRST AND THE SECOND POPULATIONS 406

BETWEEN FIRST AND SECOND AIRFRAME TYPES 408

BETWEEN FIRST AND SECOND ENGINE TYPES 410

BETWEEN FIRST AND SECOND WEIGHT/THRUST VALUES 412

CATEGORIZE EACH OF A PLURALITY OF IDENTIFIED PARTS INTO A PLURALITY OF PART CATEGORIES 414

DETERMINE A FORECAST OF FUTURE PART UTILIZATION FOR EACH PART CATEGORY 416

DETERMINE AN INFERRED PART APPLICABILITY FOR THE SECOND POPULATION DESCRIBING A PROBABILITY THAT THE IDENTIFIED PART IS UTILIZED BY THE SECOND POPULATION 418

BASED ON THE PART APPLICABILITY FOR THE FIRST POPULATION 420

BASED ON THE RELATIONSHIP BETWEEN THE PHYSICAL PARAMETERS OF THE FIRST AND THE SECOND POPULATIONS 422

DETERMINE RECURSIVELY BASED ON THE RELATIONSHIP BETWEEN THE PHYSICAL PARAMETERS AND A MEASUREMENT OF ENTITY INTEREST FOR THE IDENTIFIED PART 424

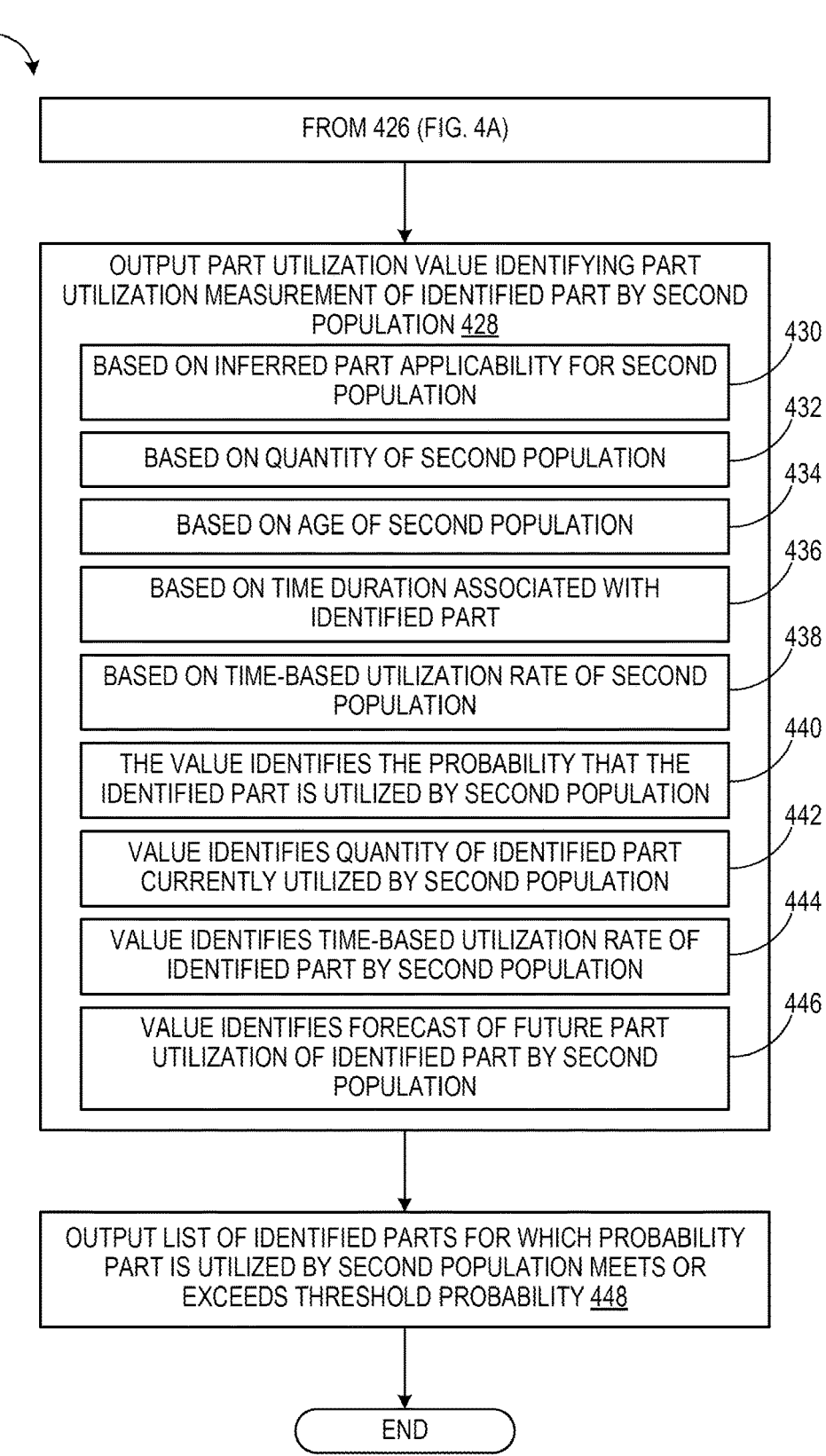

400

FROM 426 (FIG. 4A)

OUTPUT PART UTILIZATION VALUE IDENTIFYING PART UTILIZATION MEASUREMENT OF IDENTIFIED PART BY SECOND POPULATION 428

BASED ON INFERRED PART APPLICABILITY FOR SECOND POPULATION — 430

BASED ON QUANTITY OF SECOND POPULATION — 432

BASED ON AGE OF SECOND POPULATION — 434

BASED ON TIME DURATION ASSOCIATED WITH IDENTIFIED PART — 436

BASED ON TIME-BASED UTILIZATION RATE OF SECOND POPULATION — 438

THE VALUE IDENTIFIES THE PROBABILITY THAT THE IDENTIFIED PART IS UTILIZED BY SECOND POPULATION — 440

VALUE IDENTIFIES QUANTITY OF IDENTIFIED PART CURRENTLY UTILIZED BY SECOND POPULATION — 442

VALUE IDENTIFIES TIME-BASED UTILIZATION RATE OF IDENTIFIED PART BY SECOND POPULATION — 444

VALUE IDENTIFIES FORECAST OF FUTURE PART UTILIZATION OF IDENTIFIED PART BY SECOND POPULATION — 446

OUTPUT LIST OF IDENTIFIED PARTS FOR WHICH PROBABILITY PART IS UTILIZED BY SECOND POPULATION MEETS OR EXCEEDS THRESHOLD PROBABILITY 448

END

FIG. 4B

| Part Utilization Explorer | | | ✕ |
|---|---|---|---|
| Part Number | Part Category | Part Utilization | △ |
| ABC123456 | Fastener | 1.12 million/yr | |
| DEF884313 | Hardware | 5.5 k/mo | |
| GHI489130 | Electric | $ 2.3 million/yr | |
| JKL9813211 | Specialty | --- | |
| ⋮ | | | ▽ |

| Part Utilization Explorer | | | | ✕ |
|---|---|---|---|---|
| Part Number | Part Category | Airframe | Part applicability | △ |
| ABC123456 | Fastener | A123 | 75% | |
| DEF884313 | Hardware | B100 | Yes | |
| GHI489130 | Electric | F92 | 0.10 | |
| JKL9813211 | Specialty | G13 | No | |
| ⋮ | | | | ▽ |

Figure 7:
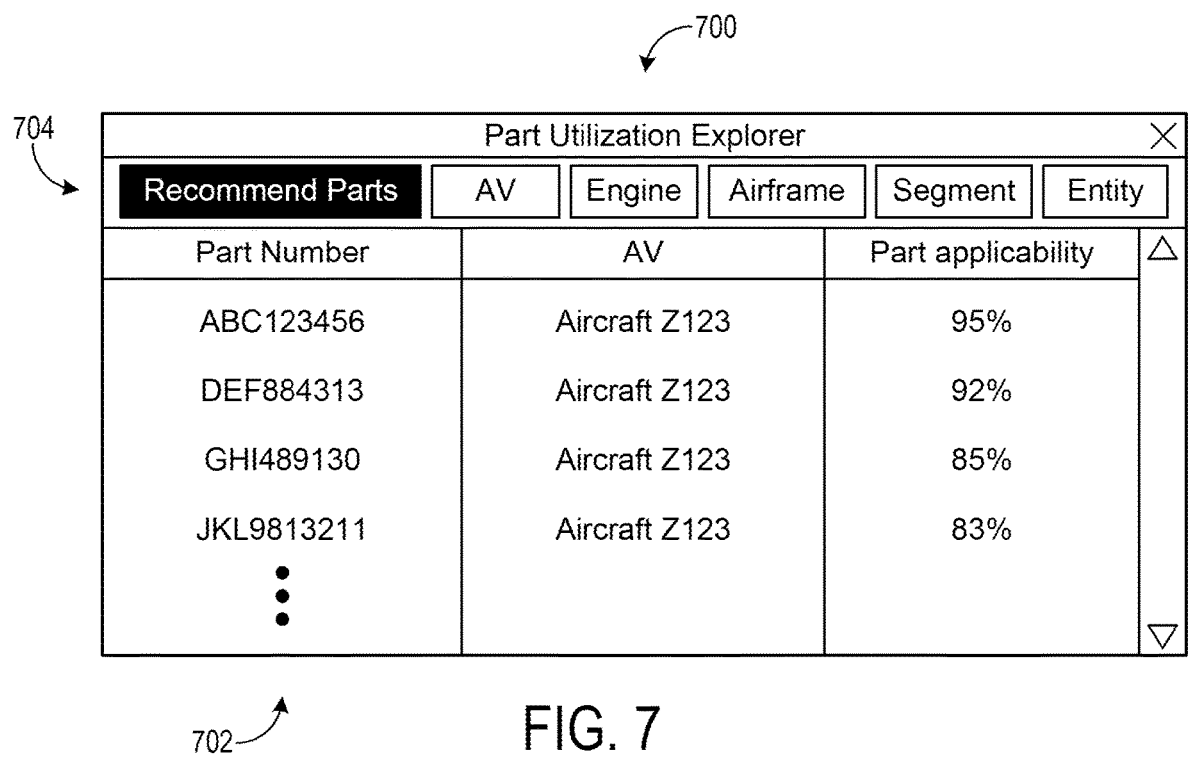

704

700

| Part Utilization Explorer | | | | | | ✕ |
|---|---|---|---|---|---|---|
| Recommend Parts | AV | Engine | Airframe | Segment | Entity | |

| Part Number | AV | Part applicability | △ |
|---|---|---|---|
| ABC123456 | Aircraft Z123 | 95% | |
| DEF884313 | Aircraft Z123 | 92% | |
| GHI489130 | Aircraft Z123 | 85% | |
| JKL9813211 | Aircraft Z123 | 83% | |
| ⋮ | | | ▽ |

DETERMINING PART UTILIZATION BY MACHINES

FIELD

The present disclosure relates generally to determining part utilization by machines, such as aeronautical vehicles, as an example.

BACKGROUND

Multi-component machines include a combination of parts that can have different lifecycles. Operation of such machines can utilize certain parts at a different rate than other parts, and can involve replacement of parts at different rates to maintain their operation. Highly complex machines, such as vehicles, and more particularly aeronautical vehicles such as aircraft include a large quantity and diverse assortment of parts that are utilized and replaced at a variety of different rates. Furthermore, among different configurations of a given category of machine (e.g., aeronautical vehicles), a particular part may be applicable to only a subset of those configurations. Various entities, including manufacturers of machines or their component parts, intermediate suppliers, maintenance service providers, and operators of machines may seek to understand part utilization, including part applicability for a diverse population of machines to ensure part availability and continued operation of such machines.

SUMMARY

A computing system and method for determining part utilization by machines, such as aeronautical vehicles, are disclosed. According to an example, a first data set is obtained that identifies a physical parameter defining a configuration of a first population of aeronautical vehicles and a part applicability of an identified part for the first population. A second data set is obtained that identifies a physical parameter defining a configuration of a second population of aeronautical vehicles that differs from the physical parameter of the first population. An inferred part applicability is determined for the second population that describes a probability that the identified part is utilized by the second population. The inferred part applicability is probabilistically inferred based, at least in part, on the part applicability and a relationship between the physical parameter of the first population and the physical parameter of the second population. A part utilization value is output that identifies a measurement of part utilization of the identified part for the second population that is based, at least in part, on the inferred part applicability.

This Summary is not intended to identify essential features, functions, or advantages of the claimed subject matter, nor is the scope of the claimed subject matter limited to implementations that address any problems or disadvantages identified by the present disclosure. In at least some examples, the features, functions, and advantages disclosed herein can be achieved independently in various embodiments or may be combined into other embodiments.

BRIEF DESCRIPTION OF THE DRAWINGS

FIGS. 4A and 4B are flow diagrams depicting an example method for determining part utilization by aeronautical vehicles.

FIGS. 5, 6, and 7 schematically depict example user interfaces presenting part utilization information.

DETAILED DESCRIPTION

Figure 1:
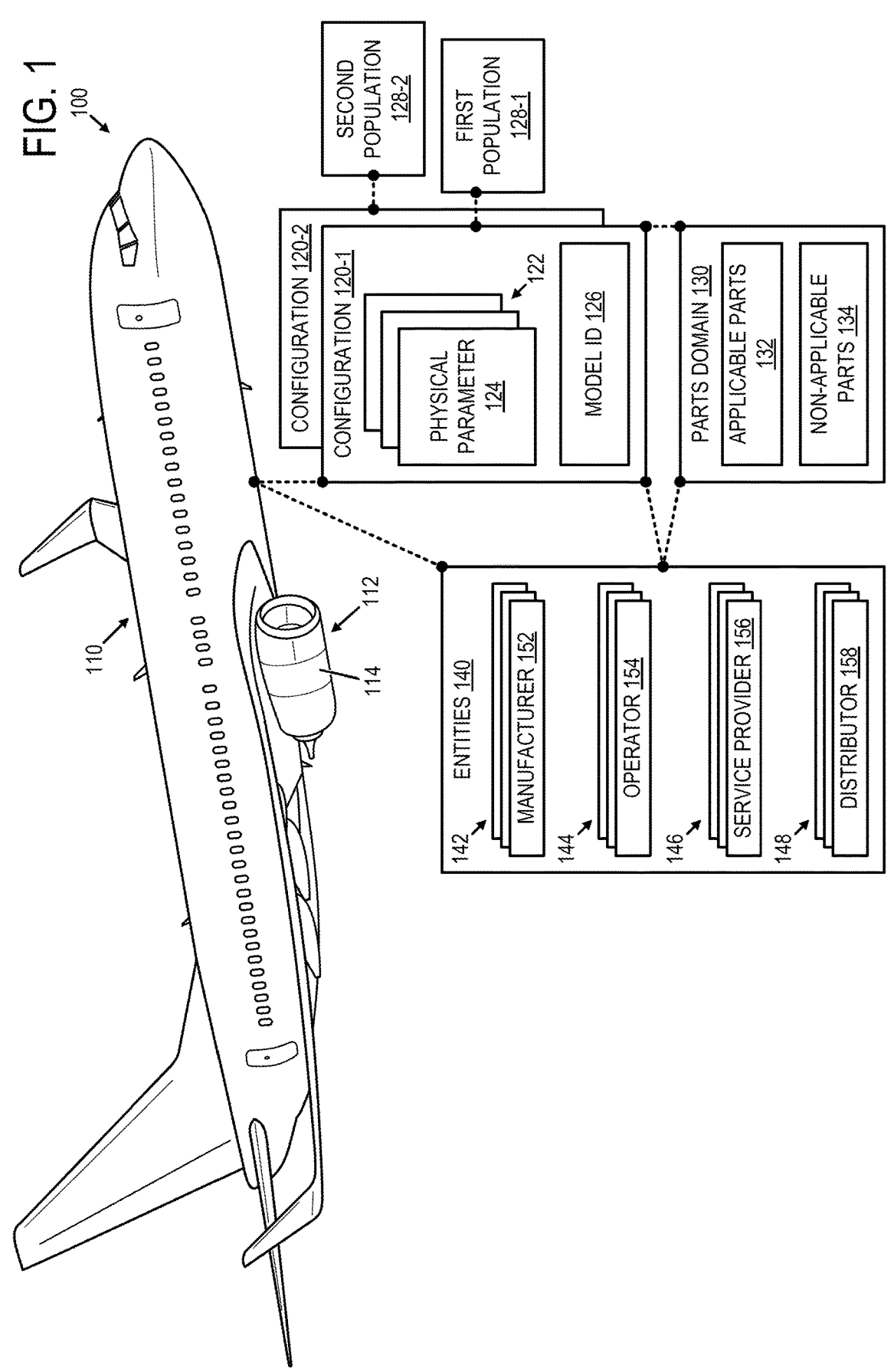
FIG. 1 depicts an example multi-component machine in the form of an aeronautical vehicle.

As briefly introduced above, various entities including manufacturers of machines or their component parts, intermediate suppliers, maintenance service providers, and operators of machines may seek to understand part utilization for a variety of reasons. A challenge to determining part utilization stems from partial or incomplete knowledge of part applicability across a diverse range of machine configurations, operational usage rates of those machines and component parts, and the lifecycle of the component parts within a particular machine configuration.

A computing system and methods that can be performed by the computing system are disclosed herein for determining part utilization by machines. An example use scenario is described herein with reference to aeronautical vehicles (AVs) as an example category of multi-component machine that can include a diverse range of machine configurations. For example, AVs can have a variety of different AV configurations, including fixed-wing aircraft, rotary-wing aircraft, satellites, rockets, etc. of various sizes, performance ratings, and operational capabilities. The disclosed computing system and methods offer the potential to address various challenges associated with determining part utilization by machines, as discussed in further detail herein.

As one example, the computing system and methods disclosed herein can involve the training and use of an inference model to infer applicability of a set of parts for a population of machines. The inferred part applicability can be represented as a probability that a part is applicable to a particular machine configuration (e.g., AV configuration). The inference model can use prior knowledge (i.e., known priors) of known part applicability and other part utilization information for a first population of machines to infer part applicability of the parts for a second population of machines having a different machine configuration from the first population. As an illustrative example, known priors of part applicability and other part utilization information of an identified part for a first population of fixed-wing commercial passenger aircraft having a first configuration (e.g., airframe type, engine type, weight/thrust rating, etc.) can be used in combination with the inference model to infer applicability of the identified part for a second population of fixed-wing commercial passenger aircraft that differs from the first configuration.

The computing system and methods disclosed herein can be used to output a part utilization value identifying a part utilization measurement of an identified part by a population of one or more machines that is based, at least in part, on the inferred part applicability. As examples, the part utilization value can take the form of: (1) a binary value identifying whether the identified part is applicable or non-applicable to a population of machines, (2) an estimated probability that the identified part is applicable or non-applicable to the population of machines, (3) an estimated quantity of the identified part currently in use by the population of machines, (4) an estimated quantity of the identified part forecasted to be in use by the population of machines at a future time, and (5) an estimated time-based utilization rate of the identified part by the population of machines. The part utilization value can provide entities such as manufacturers, intermediate suppliers, maintenance service providers, and operators with useful predictions as to part utilization by machines, including part applicability of a given part for a particular machine configuration.

Once part applicability has been inferred for a variety of part-to-AV configurations, users of the disclosed computing system can submit queries to determine various forms of part utilization. As an example, a user can provide a query to the computing system that identifies a particular AV configuration, and the computing system can provide a set of parts that are likely to be applicable to the AV configuration based on the inferred part applicability. As another example, a user can provide a query to the computing system that identifies a particular part, and the computing system can provide a set of AV configurations for which the part is likely to be applicable. In these examples, a probability threshold or other suitable conditions can be applied to the inferred part applicability by the computing system to distinguish applicable parts from non-applicable parts in responding to user queries. Such conditions can be system-defined or user-defined to achieve a desired confidence in the part utilization data output by the computing system.

FIG. 1 depicts an example multi-component machine in the form of an AV 100. In this example, AV 100 takes the form of a commercial fixed-wing passenger aircraft that comprises an airframe 110 and a propulsion system 112 of one or more engines (e.g., engine 114), represented schematically in FIG. 1. It will be understood that AV 100 can take other suitable forms, as described herein.

Machines within a given category of machine (e.g., AVs) have a configuration that can be characterized by a set of one or more physical parameters. In this example, AV 100 has an AV configuration 120-1 that can be characterized by a set of physical parameters 122, depicted schematically in FIG. 1. An example physical parameter 124 of the set of physical parameters 122 can include an airframe type of airframe 110, an engine type of engine 114 or of propulsion system 112, a weight or thrust rating of AV 100, or other suitable physical parameter or combination of physical parameters by which AV configuration 120-1 can be defined.

In at least some examples, AV configuration 120-1 may be associated with a model identifier 126 that identifies the AV configuration of AV 100. A machine, such as AV 100, can be one of a plurality of machines of a population that each have the same configuration (e.g., 120-1) and model identifier (e.g., 126). For example, for configuration 120-1 and associated model identifier 126 of AV 100, there can exist a first population 128-1 of many AVs numbering in the hundreds, thousands, or more, of which AV 100 is a member of the first population.

Another AV configuration 120-2 of AVs that differs from configuration 120-1 is represented schematically in FIG. 1. AV configuration 120-2, as an example, can be characterized by one or more physical parameters that differ from the set of physical parameters 122 of AV configuration 120-1. As examples, AVs of AV configuration 120-2 can include fixed-wing commercial passenger aircraft or other AV configurations having a different airframe type, engine type, weight or thrust rating, etc. as compared to the AVs of AV configuration 120-1. AV configuration 120-2 can be associated with a model identifier that differs from model identifier 126 of AV configuration 120-1, enabling configurations to be distinguished from each other. For AV configuration 120-2 and its associated model identifier, there can exist a second population 128-2 of many AVs numbering in the hundreds, thousands, or more.

Each machine configuration and its model identifier can be associated with a set of applicable parts. For example, AV configuration 120-1 and model identifier 126 of AV 100 can be associated with a set of applicable parts 132 within a parts domain 130 for the given category of machine (e.g. AVs). Applicable parts 132 can include original parts of the manufacturer (OEM parts) of AV configuration 120-1, as well as replacement parts of other manufacturers that can be interchangeably used for AV configuration 120-1.

Parts domain 130 can further include non-applicable parts 134 with respect to AV configuration 120-1 and associated model identifier 126. As an example, non-applicable parts 134 can include parts that are applicable to other AV configurations (e.g., 120-2), but are not applicable to AV configuration 120-1 of AV 100. In the example in which AV 100 takes the form of a commercial fixed-wing passenger aircraft, non-applicable parts 134 can include parts applicable to a rotor of a rotary-wing aircraft, as an example.

The term "part" as used herein refers to a component part of a multi-component machine. Each part can take the form of an individual component part of a multi-component machine or a subsystem of a multi-component machine that is formed by a plurality of subcomponent parts that comprise the subsystem. Thus, a part can incorporate multiple subcomponent parts and/or the part can be integrated into a subsystem in combination with one or more other parts.

FIG. 1 schematically depicts a variety of entities 140, represented schematically in FIG. 1, that can be associated with one or more of AV 100, the first population 128-1 having AV configuration 120-1, and the second population 128-2 having AV configuration 120-2, as well as one or more parts of parts domain 130. Examples of entities 140 include manufacturers 142, operators 144, service providers 146, and distributors 148.

Manufacturers 142 can include entities that manufacture machines or their component parts, including OEM parts and replacement parts. As an example, manufacturer 152 can manufacture the first population 128-1 of AVs (including AV 100) that have AV configuration 120-1. Additionally or alternatively, manufacturer 152 can manufacture a subset of parts within parts domain 130, including applicable parts 132 and/or non-applicable parts 134 for AV configuration 120-1. For example, where manufacturer 152 manufactures the first population 128-1 of AVs (including AV 100) that have configuration 120-1, manufacturer 152 can also manufacturer at least some of applicable parts 132 for the first population 128-1 of AVs. Manufacturer 152 can also manufacture non-applicable parts 134 that are applicable to other AVs having different configurations and associated model identifiers, such as AVs having configuration 120-2 of the second population 128-2. Others of manufacturers 142 can manufacture applicable parts 132 as replacement parts for the first population 128-1 of AVs having AV configuration 120-1, as another example. Some of manufacturers 142 (of a base manufacturer tier) can manufacture component parts that are used by others of manufacturers 142 (of an intermediate manufacturer tier) to manufacture subsystems that comprise a plurality of parts, and still others of manufacturers 142 (of an upper manufacturer tier) can manufacture machines that comprise parts and subsystems manufactured by the base and intermediate manufacturer tiers. Manufacturers 142 can have partial or incomplete knowledge of part applicability and utilization across parts domain 130 for certain machine configurations (e.g., 120-1, 120-2, etc.) and certain populations of machines (e.g., 128-1, 128-2, etc.).

Operators 144 can include entities that operate one or more AVs. As an example, operator 154 can refer to a commercial airline that operates AV 100 as part of a fleet of fixed-wing commercial passenger aircraft. Others of operators 144 can operate other instances of AVs having AV configuration 120-1. For example, two or more of operators 144 can refer to respective commercial airlines that operate respective instances of AVs having AV configuration 120-1. Operators 144 can also have partial or incomplete knowledge of part applicability and utilization.

Service providers 146 can include entities that provide maintenance for at least some of the first population 128-1 of AVs. As an example, service provider 156 can provide part replacement services using applicable parts 132 for AV 100 as well as other AVs having AV configuration 120-1 within first population 128-1. Service providers 146 can also have partial or incomplete knowledge of part applicability and utilization.

Distributors 148 can include entities that provide part distribution of one or more parts of parts domain 130 within a supply chain between manufacturers 142 and operators 144 or service providers 146. As an example, distributor 158 may provide part distribution of applicable parts 132 and/or non-applicable parts 134 between a subset of manufacturers 142 and a subset of operators 144 or service providers 146. Distributors 148 can also have partial or incomplete knowledge of part applicability and utilization.

Figure 2:
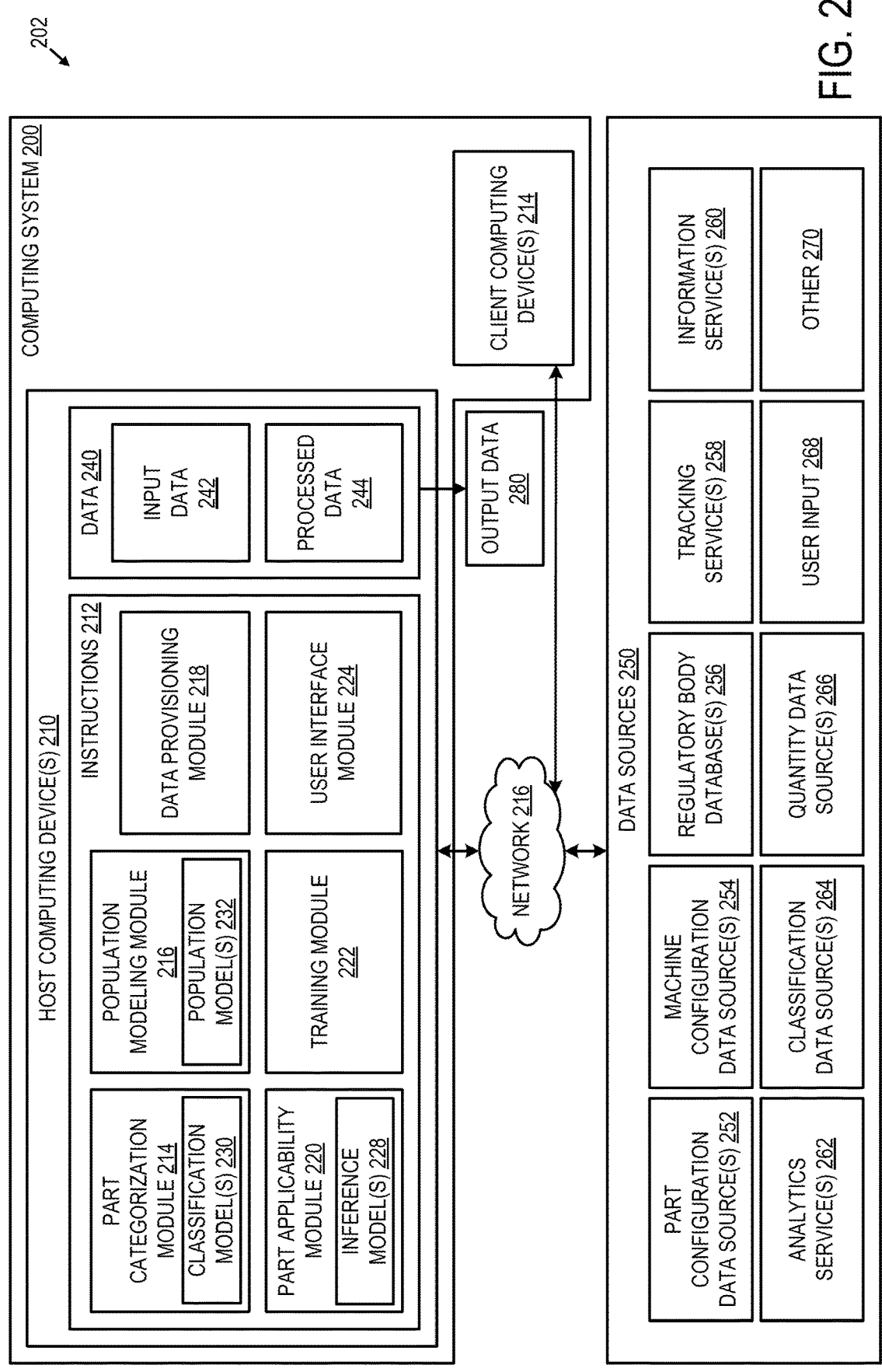
FIG. 2 schematically depicts an example computing system within an operating environment.

FIG. 2 schematically depicts an example computing system 200 within an operating environment 202. Computing system 200 can be used to determine part applicability and utilization by machines such as AVs, as an example. While AVs are provided as an example of a category of a multi-component machine, it will be understood that the approaches disclosed herein can be used for other types of multi-component machines, including other types of vehicles (land-based, water-based, etc.), stationary machines (e.g., generators, appliances, etc.), and portable machines (e.g., handheld devices, wearable devices, etc.), as examples. Accordingly, examples described herein with reference to AVs can instead refer to other types of multi-component machines. Any use of the term "AV" by the present disclosure can be replaced with the term "machine" to refer to other types of multi-component machines.

Computing system 200 is schematically depicted in simplified form in FIG. 2. Computing system 200 can include one or more computing devices. As an example, computing system 200 can include one or more host computing devices 210 that execute instructions 212 to determine part applicability and utilization. In at least some examples, computing system 200 can include one or more client computing devices 214 by which users can interact with host computing devices 210 of computing system 200. Client computing devices 214 can communicate with host computing devices 210 of computing system 200 via a communications network 216, as an example. Host computing devices 210 may be co-located or distributed, and can communicate with each other via network 216 in at least some examples. Aspects of computing system 200 are described in further detail with reference to FIG. 9.

Instructions 212 can include one or more programs or program components referred to herein as modules. As an example, instructions 212 can include a part categorization module 214, a population modeling module 216, a data provisioning module 118, a part applicability module 226, a training module 222, and a user interface module 224, as example components of instructions 212 described in further detail herein.

Part applicability module 220 can be used to determine an inferred part applicability of each part of a parts domain (e.g., 130) for each AV configuration of an AV domain by implementing one or more inference models 228. As an example, an inferred part applicability determined by part applicability module 220 for a particular part-to-AV configuration describes a probability that a particular part is utilized by a particular AV configuration. Aspects of part applicability module 220 are described in further detail with reference to FIG. 3.

Part categorization module 214 can be used to categorize each part of a parts domain (e.g., 130 of FIG. 1) into one of a plurality of part categories by implementing one or more classification models 230. In at least some examples, computing system 200 can implement a variety of different processing pipelines depending on the part category to which each part is categorized. Aspects of part categorization module 230 are described in further detail with reference to FIG. 4A.

Data provisioning module 218 can be used to obtain input data 242 from various data sources 250 and to process the input data into data forms (e.g., within processed data 244) that are suitable for use by other modules of instructions 212.

Population modeling module 216 implementing one or more population models 232 can be used to model populations of AVs and their component parts. As an example, population modeling module 216 can be used to determine a quantity of AVs of a particular AV configuration currently in service and a quantity of units of each component part of those AVs. The quantity of units of AVs and their component parts can be determined by population modeling module 216 on a geographic basis (e.g., worldwide, geographic boundary basis, political boundary basis, etc.), an entity basis (e.g., manufacturer, operator, service provider, distributor, etc.), and/or a timeframe basis, including current and future timeframes. Given known and inferred part applicability determined by part applicability module 220, population modeling module 216 can be used to determine a quantity of units of each applicable part of a parts domain utilized by each unit of AV configuration.

Training module 222 can be used to train models of other modules of instructions 212, including inference models 228, classification models 230, and population models 232, as examples. Aspects of training module 222 are described in further detail with reference to FIG. 8.

User interface module 224 facilitates user interaction with the various modules of instructions 212 and data available to computing system 200. For example, users of client computing devices 214 can provide input to and receive output from host computing devices 210 implementing user interface module 224. Host computing devices 210 can enable users to access data on a secured, credentialed basis, for example. User interface module 224 can support user interaction through a web-based portal accessed via a web browser or other application program executed at client computing devices 214, as examples.

Computing system 200 can include data 240 stored thereon, including input data 242 that was input to the computing system and processed data 244 that was obtained by the computing system processing input data 242. Data 240 can be stored at host computing devices 210 or other suitable computer-accessible location. Host computing devices 210 of computing system 200 can obtain input data 242 from various data sources 250, represented schematically in FIG. 1.

Input data 242 can be obtained by computing system 200 from data sources 250 in a variety of ways. As an example, input data 242 can be obtained by host computing devices 210 from other computing devices or computing systems via communications network 216. Data sources 250 can reside at various computing devices or computing systems that are accessible to host computing devices 210. Additionally or alternatively, input data 242 can be obtained from data sources 250 as user input via client computing devices 214. Data 240, including input data 242, processed data 244, or portions thereof can be output by computing system 200 as output data 280 in a variety of ways. As an example, output data 280 can be output by host computing devices 210 via one or more peripheral output devices or via client computing devices 214 of computing system 200.

Examples of data sources 250 can include one or more part configuration data sources 252, one or more machine configuration data sources 254, one or more regulatory body databases 256, one or more tracking services 258, one or more information services 260, one or more analytics services 262, one or more classification data sources 264, one or more unit quantity data sources 266, user input 268 from users (e.g., system operators, subject matter experts, etc.) of computing system 200, and other sources 270, as described in further detail herein.

Part configuration data sources 252 can provide part configuration data describing one or more of part dimension(s), size, weight, density, material composition, and/or any other suitable material property or physical parameter; part design parameters and/or performance ratings; part schematics and/or models; data regarding part testing, part consumption (e.g., consumption rate), part replacement (e.g., schedule, frequency, quantity) and/or part performance; part price or cost data; and other suitable parts-related data. In some examples, part configuration data can identify individual parts (e.g., via names, alphanumeric identifiers, classification codes, and/or any other suitable identifying information). Further, part configuration data source 110 can provide configuration data at various levels, such as a per-part level, per-part category level, per-part manufacturer level, etc.

Machine configuration data sources 254 can provide machine configuration data, such as AV configuration data that describes various AV configurations of an AV domain. As examples, AV configuration data can include data describing one or more of AV dimension(s), size, weight, density, material composition, component parts included in the AV, and/or any other suitable material property or physical parameter; AV design parameters and/or performance ratings; AV schematics and/or models; data regarding AV testing, consumption (e.g., fuel consumption, part consumption), AV maintenance (e.g., schedule, frequency, quantity), AV performance; AV price or cost data; and/or any other suitable data regarding aircraft or other AV configurations. AV configuration data can identify individual AVs or AV configurations (e.g., via names, alphanumeric identifiers, classification codes, and/or any other suitable identifying information). Further, machine configuration data source 110 can provide configuration data at various levels, such as at a per-AV level, per-AV configuration level, per-AV manufacturer level, etc. As an example, machine configuration data sources 254 can provide AV configuration data at a per-AV level describing one or more of an airframe type and/or model, engine type and/or engine model, engine thrust rating, engine weight rating, AV size, AV weight, AV age, and/or any other suitable physical parameters. As described in further detail herein, AV configuration as characterized by a set of one or more physical parameters can be used to quantify AV populations and their component parts, where such quantity-related data can be used to inform part utilization.

Part configuration data sources 252 and machine configuration data sources 254 can include data obtained from various entities such as manufacturers, distributors, service providers, and operators, as examples. In some examples, an entity can possess knowledge indicating a known utilization of AV parts by a population of AVs. The entity can sell parts for use by the population, manufacture the parts, or otherwise serve a first population of AVs, for example. For a different AV population for which knowledge indicating a known utilization of AV parts by the population is not available to the entity, the entity can use computing system 200 to make probabilistic inferences about the likelihood that parts—such as those known to be utilized by the first population of AVs are utilized by AVs of the other population.

Regulatory body databases 256 can include configuration data for AVs and their component parts that are subject to regulation or oversight by a regulatory body. For example, regulatory body databases 256 can include configuration data for AV parts (e.g., AV parts manufactured by third parties) approved by the regulatory body for use in specific AVs. As such, database 256 can provide information regarding part applicability for at least some parts for a domain of AVs. For example, database 256 can indicate whether a particular part is utilized by a particular AV configuration. Further, in some examples, database 114 can indicate part utilization by AVs in the form of part consumption rates, part replacement schedules, and other suitable measures of part utilization.

In at least some examples, a lack of information within databases 256 regarding part applicability for an AV configuration can be used to infer that the part may not be applicable to the AV configuration. However, regulatory body databases 256 may not provide sufficient granularity of all parts that are applicable to each AV configuration. For example, regulatory body databases 256 may refer to larger-scale components that include many parts not specifically identified by the databases. As such, the ability for computing system 200 to infer part applicability for parts not identified within regulatory body databases 256, but that are nonetheless present within larger-scale components can address the granularity shortcomings of these databases.

Tracking services 258 can provide data regarding AV operational utilization rates, such as AV flight hours. For example, tracking services 258 can identify the flight hours undertaken by individual AVs over time. Flight hours indicated by tracking service 258 can be used to determine the flight hours undertaken by a population of AVs. For example, tracking service 258 can indicate the flight hours undertaken by commercial aircraft in a particular regionality (e.g., country) such that the total flight hours by aircraft—including commercial and potentially other types of AVs—in that region can be estimated with sufficient accuracy. As described in further detail herein, data indicating operational utilization rates can be used by computing system 200 to quantify aspects of part utilization, AV populations, and AV utilization.

Information services 260 can provide additional informational data regarding AV parts and/or AV utilization. As examples, information services 260 can provide information in the form of news, reports, schedules, routes, AV populations, routes, and/or traffic. Analytics services 262 can provide analytic data regarding shipments, billings, deliveries, statistical data, and/or safety data relating to AVs and their component parts. As another example, analytics service 120 can provide financial reports such as industry form 41 (F41) reports indicating information regarding certified air carriers in the United States or other regions. These and/or other reports can include information regarding balance sheets, cash flow, employment, income, fuel cost, fuel consumption, and operating expenses relating to AV utilization. As described in further detail herein, computing system 200 can use data obtained from services 260 and 262 to quantify aspects of part utilization, AV populations, and AV utilization.

Classification data sources 264 can provide data regarding classifications of AV parts. In some examples, classification data sources 264 can provide data regarding traded commodities. As such, classification data sources 264 can provide information regarding the quantity of an AV parts population. Classifications indicated by classification data source 122 can include harmonized tariff schedule (HTS) codes, and/or any other suitable type of classification information. As described herein, part classifications obtained via classification data sources 264 can be used by computing system 200 implementing part categorization module 214 to categorize populations of AV parts into part categories, for which per-category part utilization can be determined.

Quantity data sources 266 can provide quantity-related data regarding AV populations and their component parts. For example, quantity-related data can include data indicating sales of AV parts and/or AVs. Further, quantity data source 266 can provide different quantity-related data sets for different segments of an AVs and/or AV parts population—e.g., separate data sets for aftermarket and original equipment manufacturer (OEM) segments, respectively. In some examples, quantity data source 266 can provide quantity-related data associated with an identified AV configuration (e.g., airframe type). This data can relate to sales by an individual entity such as an operator or manufacturer, for example. As such, quantity-related data obtained via quantity data sources 266 may capture a limited subset of an overall AV population or parts domain. Part applicability module 220 can be used to extend quantity-related knowledge from a subset of an AV population and/or parts domain to other segments of the population or domain.

In some examples, quantity data sources 266 can provide data indicating a duration of time associated with an identified part, such as a part lifecycle. This can be directly indicated—e.g., as an average part lifecycle of the part—or indirectly—e.g. data sources 266 can provide information from which computing system 200 can compute a part lifecycle of the part. Further, quantity data sources 266 can provide data indicating a time-based utilization rate of an AV population. The time-based utilization rate can indicate a utilization rate by AVs in the population of a particular part, a different identified part, a category or type of part, or type of utilization rate.

In some examples, quantity-related data obtained via quantity data source 266 can be used to identify interest by an entity in a particular part. For example, where quantity-related data indicates sales of an AV part to an entity, such data can be used to identify interest by the entity in the AV part. Other types of data can be used to identify entity interest or lack of entity interest with respect to AV parts. For example, a quote (e.g., a price quote) requested by and/or provided to an entity regarding an AV part can be interpreted as interest by the entity in the part. As another example, a search (e.g., through a web browser or other application) by the entity for an AV part can be interpreted as interest by the entity in the part. As described herein, computing system 200 can enable users to search for AV parts, where user searches and other types of user engagement with the computing system 200 can inform knowledge about entity interest in AV parts.

As previously discussed, data provisioning module 218 can obtain data from one or more of data sources 250 and make such data available to modules of instructions 212. Data provisioning module 218 can implement other functions that relate to data aggregation and processing, such as blending data and inferring values for missing data. Data can be combined to develop profiles indicating delivery histories (e.g., for different entities, AVs, parts, etc.), as an example. As another example, data regarding airports, demographics, and gross domestic product of a region can be combined to quantify aspects of an AV population, such as a demand for AV parts for the AV population. As yet another example, data provisioning module 218 can obtain information regarding AV maintenance, which can be mapped (e.g., via computing system 200) to an expected demand for AV parts.

To implement the functionality described herein, computing system 200 including various modules of instructions 212 can use various models and techniques, including but not limited to linear regression, logistic regression, power regression, decision tree classification and/or regression, Monte Carlo simulation, and signal detection methods. As an example, manufacturing schedules of AV parts and AVs can be modeled using logistic regression, where modeled manufacturing schedules can be used by computing system 200 to infer part applicability and inform part utilization. As another example, Monte Carlo techniques can be used to determine values for missing data, such as values regarding AV engine configurations and/or regions to which AVs or their component parts are delivered. Filling missing values can aid in computing system 200 making inferences about part applicability and utilization by AVs for which there is a lack of knowledge.

Computing system 200 can leverage part applicability module 220 in combination with other modules of instructions 212 to make inferences about how AV parts are utilized by AVs, in the past, currently, and in the future. In some examples, information about part applicability and utilization can be determined for each of a set of part categories, such as part categories into which AV parts are categorized via part categorization module 214.

Figure 3:
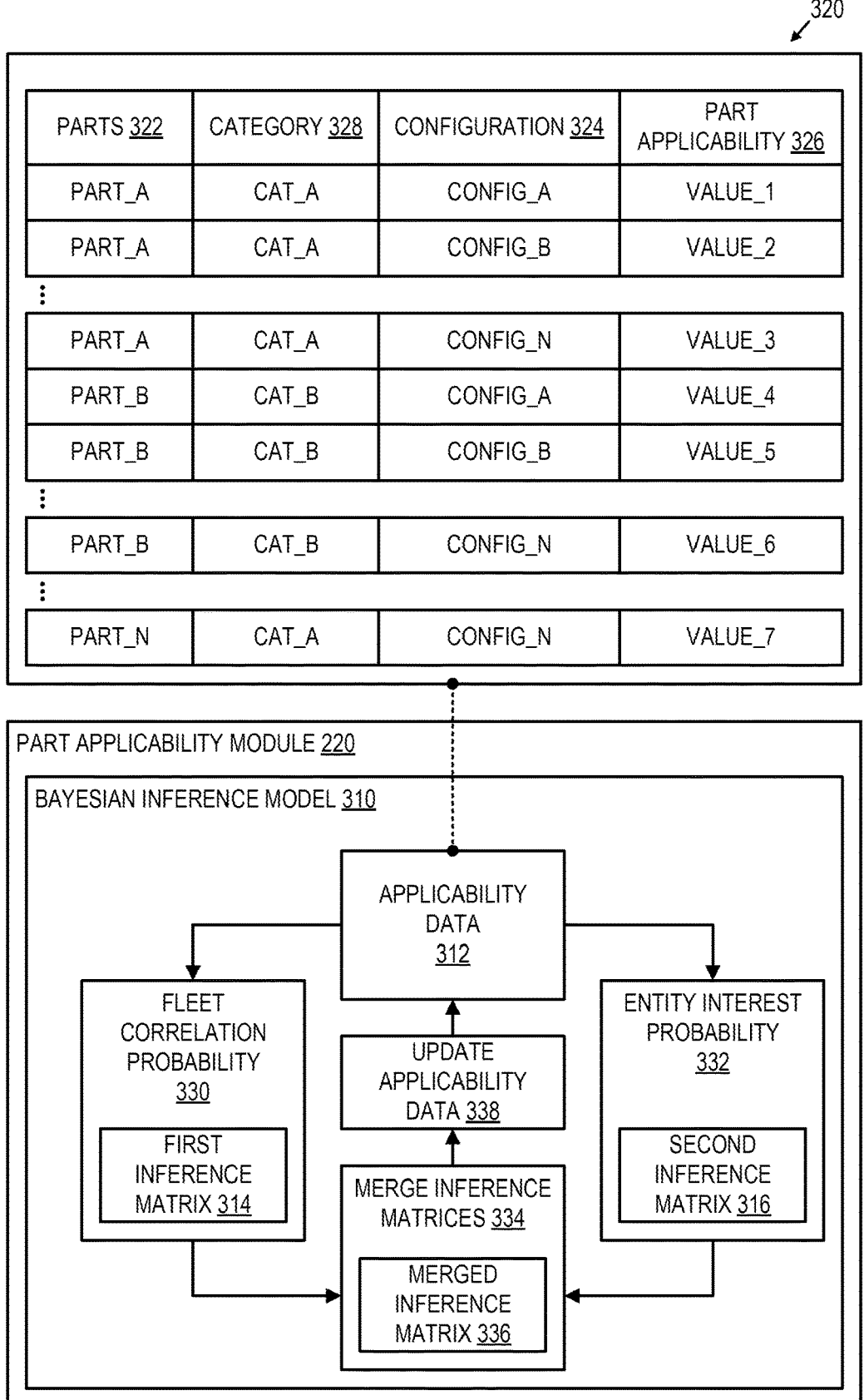
FIG. 3 schematically depicts aspects of a part applicability module of FIG. 2.

FIG. 3 schematically depicts aspects of part applicability module 220 of FIG. 2. In the example of FIG. 3, part applicability module 220 implements a Bayesian inference model 310 to infer part applicability of parts for various AV configurations. Bayesian inference model 310 is an example of inference models 228 of FIG. 2. The inferred part applicability describes a probability that a particular part is utilized by a particular AV configuration. In at least some examples, Bayesian inference model 310 begins with a set of training priors within applicability data 312, and then uses informant sources for two competing inference matrices (e.g., 314 and 316) to update probability assumptions recursively until convergence is achieved. As described in further detail with reference to FIG. 8, inference models 228, including Bayesian inference model 310, can be trained to infer part applicability of a particular part for a particular AV configuration.

Given a parts domain (e.g., 130) and an AV domain of AV configurations, part applicability module 220 can be used to determine an inferred part applicability of each part of the parts domain for each AV configuration of the AV domain. As an example, millions of combinations of parts and AV configurations can be considered and processed by part applicability module 220. Part applicability module 220 can reference and update applicability data 312 recursively and over a period of time as input data is obtained. Applicability data 312 can be maintained within a database accessible to computing system 200 of FIG. 2, such as within data 240, as an example.

Applicability data 312 associates each part of the parts domain (e.g., 130) with a corresponding part applicability (e.g., a probability) for a particular AV configuration. An example of applicability data 312 is depicted schematically in FIG. 3 as a data table 320 including a parts 322 subdomain (e.g., a column) that includes corresponding part identifiers (e.g., PART_A, PART_B through PART_N) of the various parts of the parts domain, where the N term represents a total quantity of parts of the parts domain. Data table 320 further includes a configuration 324 subdomain that includes configuration identifiers (e.g., CONFIG_A, CONFIG_B through CONFIG_N) of the various AV configurations of the AV domain, where the N term represents a total quantity of AV configurations. Data table 320 further includes a part applicability 326 subdomain that includes part applicability values (e.g., VALUE_1 through VALUE_7) for each part identifier-to-configuration identifier combination. Additionally, within the example depicted in FIG. 3, data table 320 has a category 328 subdomain that includes category identifiers (e.g., CAT_A, CAT_B, etc.) that identify a part category associated with each part identifier.

In example data table 320, a part identified as PART_A is associated with a part applicability value identified as VALUE_1 for an AV configuration identified as CONFIG_A. The part identified as PART_A is also associated with another part applicability value identified as VALUE_2 for another AV configuration identified as CONFIG_B. VALUE_1 and VALUE_2 each reflect the part applicability associated with the same part identified as PART_A for the AV configurations identified as CONFIG_A and CONFIG_B, respectively. As an example, the part applicability values identified as VALUE_1 and VALUE_2 can differ from each other for the same part due to differences in the applicability of the part to AV configurations of CONFIG_A and CONFIG_B.

Part applicability can be represented by a part applicability value within a predefined range of values (e.g., 0.0 to 1.0). As an example, a part applicability value of 1.0 can be defined as representing that a particular part is applicable to a particular AV configuration; a part applicability value of 0.0 can be defined as representing that a particular part is non-applicable to a particular AV configuration; and values between 0.0 and 1.0 can represent a probability that a particular part is applicable or non-applicable to a particular AV configuration.

The part applicability values that bound the predefined range of values (e.g., 0.0 and 1.0 in the above example) can be referred to as ground truth values for training an inference model, such as Bayesian inference model 310 or other suitable type of model. These ground truth values are examples of known priors, which in the context of training a model can be referred to as training priors. For example, an entity (e.g., a manufacturer, operator, service provider, distributor, etc.) may have prior knowledge that a part is applicable or non-applicable to a first AV configuration, which enables that part to be associated with a part applicability value of either 1.0 or 0.0 within applicability data

312. Continuing with this example, the entity may not have prior knowledge of whether the part is applicable or non-applicable to a second AV configuration that differs from the first AV configuration due to differences in one or more physical parameters of the AVs. In this example, the part applicability value can be inferred by part applicability module 220 implementing Bayesian inference model 310 based, at least in part, on training priors, including the ground truth values present within applicability data 312.

In at least some examples, part applicability module 220 does not perform updates or make changes to training priors (e.g., part applicability values of 0.0 and 1.0) beyond changes manually enacted by users, and does not set inferred part applicability values to the part applicability values of the training priors (e.g., 0.0 and 1.0). In this example, part applicability module 220 treats training priors as hard-coded values, and maintains inferred part applicability values within a range bounded by the training priors for applicable and non-applicable part-to-AV configuration combinations. The addition of training priors identifying non-applicable part-to-AV configuration pairs (e.g., a part applicability value of 0.0) can improve precision of the model for determining inferred part applicability, while the addition of training priors identifying applicable part-to-AV configuration pairs (e.g., a part applicability value 1.0) can improve recall and precision of the model.

Part applicability module 220 can update applicability data 312 by implementing Bayesian inference model 310 over a plurality of epochs. For each epoch, part applicability module 220 generates a first inference matrix 314 that considers fleet correlation probability 330 and generates a second inference matrix 316 that considers entity interest probability 332. For each epoch, the first inference matrix 314 is merged with the second inference matrix at 334 to obtain a merged inference matrix 336, and applicability data 312 is updated based on the merged inference matrix as indicated schematically at 338. This approach is repeated over a plurality of epochs, enabling part applicability module 220 implementing Bayesian inference model 310 to probabilistically infer part applicability as a converged probability through recursive Bayesian state estimation.

The use of multiple inference matrices to determine a different measure of probability can be analogized to sensor fusion of multiple sensor measurements. In this example, probabilities determined for first inference matrix 314 that considers fleet correlation probability 330 represents a first sensor measurement obtained by a first sensor, and probabilities determined for second inference matrix 316 that considers entity interest probability 332 represents a second sensor measurement obtained by a second sensor. Similar to sensor fusion, the merged inference matrix has the potential to provide a more complete measurement of probability as compared to use of a single inference matrix.

Fleet correlation probability 330 refers to correlating different AV configurations with each other based on their respective physical parameters to obtain configuration-to-configuration correlations. Fleet correlation probability 330 provides a measurement of a relationship between different machine configurations defined by one or more physical parameters that differ from each other. As an example, each AV configuration that does not have a known, training prior for part applicability and for which part applicability is to be inferred can be correlated with other AV configurations that have known, training priors for part applicability. The correlation between these AV configurations is an example of a relationship that can be determined between physical parameters of different AV configurations. First inference matrix 314 can include a configuration-to-configuration correlation for each combination of an AV configuration having a known, training prior for part applicability and another AV configuration having an unknown part applicability.

Once configuration-to-configuration correlations have been obtained, these correlations can be applied to known, training priors for part applicability on a part-by-part basis. As an example, a configuration-to-configuration correlation can be obtained between a first AV configuration having known, training priors for part applicability and a second AV configuration for which part applicability is to be inferred. For each part for which the first AV configuration has a known, training prior for part applicability, the correlation can be applied to the known, training prior to obtain an epoch-specific inferred part applicability of that part for the second AV configuration. In this example, the configuration-to-configuration correlation influences the epoch-specific inferred part applicability of a part-to-configuration combination of the unknown AV configuration based on a known, training prior for part applicability of the part for a known AV configuration.

For example, as the correlation between two AV configurations increases between a first AV configuration having known, training priors for part applicability and a second AV configuration for which part applicability is to be inferred, the probability represented by the epoch-specific inferred part applicability value(s) for the second AV configuration at the epoch tends toward the part applicability value(s) of the first configuration of AVs. Conversely, as the correlation between AV configurations decreases between a first AV configuration having known, training priors for part applicability and a second AV configuration, the probability represented by the epoch-specific inferred part applicability value(s) for the second AV configuration moves away from the part applicability value(s) of the first AV configuration and toward the opposing value bounding the predefined range of part applicability values.

Entity interest probability 332 can refer to a probability that a particular entity has expressed interest in a particular part. As previously described with reference to data sources 250, entities can be identified as being attributed to (e.g., serving) particular AV configurations. For example, an operator may operate multiple instances of a particular AV configuration. In at least some examples, entity interest probability 332 can be based on a comparison of a quantity of units of a part attributed to an entity's interest in the part in relation to a total quantity of units assigned to that part. As the quantity of units attributed to the entity's interest increases in relation to the total quantity of units assigned to the part, the entity interest probability increases toward an upper probability bound (e.g., 1.0). Conversely, as the quantity of units attributed to the entity's interest decreases in relation to the total quantity of units attributed to the part, the entity interest probability decreases toward a lower probability bound (e.g., 0.0).

Second inference matrix 316 can include an entity interest probability for each part-to-entity combination. Once entity interest probabilities have been obtained across the domain of parts, an AV configuration attributed to each entity can form a respective part-to-configuration combination across the domain of parts that is associated with the entity interest probability for that part.

In merging the inference matrices at 334, the entity interest probability associated with each part-to-configuration combination within second inference matrix 316 and the epoch-specific inference part applicability of the part-to-configuration combination obtained from the first inference matrix 314 can each influence the inferred part applicability for the part-to-configuration combination within applicability data 312. Applicability data 312 can be updated at each epoch based on the merged inference matrices over a plurality of epochs until a suitable level of convergence is achieved. The use and training of part applicability module 220 is described in further detail with reference to the flow diagrams of FIGS. 4A, 4B, and 8.

FIGS. 4A and 4B are flowcharts depicting an example method 400 for determining part utilization by machines, such as AVs, as an example. Method 400 can be performed by computing system 200 of FIG. 2 implementing instructions 212, as an example.

At 402, method 400 includes obtaining a first data set identifying a physical parameter of a first population of one or more AVs and a part applicability of an identified part for the first population of AVs. The physical parameter (e.g., a first airframe type, a first engine type, etc.) of the first population of one or more AVs can define an aspect of a configuration of the first population. As an example, the first data set can take the form of a known, training prior for a part-to-configuration combination assigned a part applicability value of either 0.0 (identifying the part as non-applicable) or a 1.0 (identifying the part as applicable) within part applicability data 312 of FIG. 3.

At 404, method 400 includes obtaining a second data set identifying a physical parameter of a second population of one or more AVs that differs from the physical parameter of the first population. The physical parameter (e.g., a second airframe type, a second engine type, etc.) of the second population of one or more AVs can define an aspect of a configuration of the second population that differs from the configuration of the first population.

Examples of AV having different configurations can include aircraft that differ in airframe type, airframe weight, other airframe characteristics, engine type, engine weight, engine thrust, other engine characteristics, intended operation, design parameters, class or classification, and/or any other suitable combination of physical parameters. As such, an AV configuration can be defined in terms of one or more physical parameters. These and/or other types of physical parameters can be identified in the first and second data sets.

At 406, method 400 includes determining a relationship between the physical parameter of the first population and the physical parameter of the second population. As an example, the relationship determined at 406 can include or be represented by a fleet correlation probability, such as previously described with reference to fleet correlation probability 330 of first inference matrix 314 of FIG. 3.

As examples, determining the relationship at 406 can include determining a relationship at 408 between a first airframe type of the first population and a second airframe type of the second population; determining a relationship at 410 between a first engine type of the first population and a second engine type of the second population; and/or determining a relationship at 412 between a first engine weight or thrust value of the first population and a second engine weight or thrust value of the second population.

Any suitable type of relationship can be determined between physical parameters of the first and second populations. As previously discussed, learned relationships can include a measure of correlation between two different physical parameters. As another example, learned relationships can include measures of mutual exclusivity—for example, knowledge that an identified AV part is utilized by an identified airframe can lead to determining that the identified part is not utilized by a different type of airframe.

In another example, learned relationships can use knowledge that an identified part is utilized by an identified airframe to infer a probability that the identified part is utilized by a different type of airframe. Learned relationships can be determined using any suitable combination of modules of instructions 212 of FIG. 2 based on data obtained from data sources 250.

At 414, method 400 includes categorizing each of a plurality of identified parts, including the identified AV part of the first data set, into a plurality of part categories. Part categorization module 214 of FIG. 2 can be used to perform categorization as described herein.

At 416, method 400 includes determining a forecast of future part utilization for each of the one or more part categories. As an example, the forecast determined at 416 can refer to a total part utilization for each part against which entity interest probability can be determined, as previously described with reference to entity interest probability 332 of second inference matrix 316 of FIG. 3. Future part utilization can be forecasted using any suitable combination of modules of instructions 212 of FIG. 2 based on data obtained from data sources 250.

At 418, method 400 includes determining an inferred part applicability for the second population describing a probability that the identified part is utilized by the second population of AVs. The inferred part applicability can probabilistically inferred based, at least in part, on the part applicability and the relationship between the physical parameter of the first population and the physical parameter of the second population.

As one example, the inferred part applicability determined at 418 can include an epoch-specific inferred part applicability as determined for first inference matrix 314 of FIG. 3. As another example, the inferred part applicability determined at 418 can include an inferred part applicability of merged inference matrix 336 of FIG. 3 that is influenced by both the epoch-specific fleet correlation probability of first inference matrix 314 and the epoch-specific entity interest probability of second inference matrix 316, as previously described with reference to FIG. 3.

As indicated at 424, the probability that the identified part is utilized by the second population can be determined recursively (e.g., over one or more epochs using Bayesian inference model 310 of FIG. 3) based on the relationship determined at 406 and further based on a measurement of entity interest in the identified part. As previously described with reference to FIG. 3, the measurement of entity interest can be represented as an entity interest probability. In at least some examples, the entity interest probability can be based on the forecast of future part utilization determined at 416, or other suitable measure of part utilization or consumption.

Turning to FIG. 4B, at 428, method 400 includes outputting a part utilization value identifying a measurement of part utilization of the identified part by the second population of AVs. As indicated at 430, the part utilization value can be determined based on the inferred part applicability determined at 418. In at least some examples, the part utilization value can be determined further based on a quantity of AVs of the second population as indicated at 432, an age of the AVs of the second population as indicated at 434, a time duration (e.g., operational lifecycle) associated with the identified part at 436, and/or a time-based utilization rate of the AVs of the second population as indicated at 438. As previously described with reference to FIG. 2, data such as the operational lifecycle of parts, and the quantity, age, and time-based utilization of AVs can be obtained by the computing system from data sources 250.

The part utilization value can identify any suitable measurement(s) of part utilization of the identified part by the second population. As indicated at 440, the part utilization value can identify the probability that the identified part is utilized by the second population as represented by the inferred part applicability determined at 418. As indicated at 442, the part utilization value can identify a quantity of the identified part currently utilized by the second population of AVs. As indicated at 444, the part utilization value can identify a time-based utilization rate of the identified part by the second population of AVs. As indicated at 446, the part utilization value can identify a forecast of future part utilization of the identified part by the second population.

At 448, method 400 includes outputting a list of one or more identified parts for which the probability that the identified parts are utilized by the second population of AVs meets or exceeds a threshold probability. As an example, the previously described operations of method 400 can be performed for each part of a plurality of parts of a parts domain to obtain an inferred part applicability, represented by a corresponding probability, for each part. The list of identified parts output at 448 can take the form of a list of recommended parts for the configuration of the second population of AVs.

Figure 5:
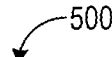

FIG. 5 schematically depicts an example graphical user interface 500 by which output data 280 of FIG. 2 can be output by computing system 200. User interfaces, such as user interface 500 can be presented via a display device as part of an internet browser or application program executed by the computing system or computing device thereof, as an example. In FIG. 5, various examples of part utilization values are output for respective parts identified by part number and associated part category. User interface 500 illustrates example forms of part utilization values, including but not limited to a quantity of parts utilized per unit time (e.g., year, month, etc.), and a monetary value assigned to the utilization of the parts (e.g., as a measurement of purchased value of the parts). User interface 500 also depicts an absence of a measurement of part utilization for a part, which can indicate that the part is not utilized.

Figure 6:

FIG. 6 schematically depicts another example graphical user interface 600 by which output data 280 can be output by computing system 200 of FIG. 2. In FIG. 6, various examples of part applicability values are output for respective parts identified by part number and associated part category for respective airframes. In this example, airframes are used as an example physical parameter that defines a machine configuration. It will be understood that other suitable physical parameters and machine configurations can be used for other types of machines. The part applicability values can take various forms including a probability represented as a percentage or decimal value that a part is applicable to a corresponding airframe. As another example, a binary indication (e.g., yes/no or 1/0) of whether each part is applicable to a corresponding airframe can be output. In the case of a binary indication, a threshold can be applied to the part applicability value to delineate applicable parts from non-applicable parts for each airframe.

FIG. 7 schematically depicts another example graphical user interface 700 by which output data 280 can be output by computing system 200 of FIG. 2. In FIG. 7, a set of recommended parts 702 are output for a particular AV configuration along with associated part applicability values representing a probability that the parts are utilized by the AV configuration. In this example, the set of recommended parts 702 include parts having a part applicability value for the AV configuration that satisfy a condition, such as a threshold part applicability value (e.g., a probability of 80% or greater). The threshold part applicability value can be system-defined or user-defined, as examples.

FIG. 7 also illustrates, through various example controls 704, how part applicability, utilization and other information can be provided in view of various filters or settings that can be applied by users interacting with user interface 700. For example, user interface 700 can include one or more of a recommend parts control selectable to generate recommended parts list 702, an AV control selectable to filter part recommendations by identified AV (and/or AV configuration, classification, and/or other AV parameters), an engine control selectable to filter part recommendations by identified engines (and/or engine type, thrust, weight, and/or other engine parameters), an airframe control selectable to filter part recommendations by identified airframes (and/or airframe type, classification, weight, and/or other airframe parameters), a segment control selectable to filter part recommendations by segment (e.g., aftermarket/OEM/total, commercial/military/aerospace/civil/business, other part population, AV population, and entity segments), and an entity control selectable to filter part recommendations by entity (e.g., by identified entities, by entity type, by entity segment). Any other suitable criteria can be used to filter and apply selections to outputs of part recommendations, part utilization, and/or part applicability. Moreover, it will be understood that the filtering and selection can apply to other types of outputs that can be provided to users of computing system 200 via user interface module 224 of FIG. 2, including but not limited to quantifications of populations (e.g., entity populations, part populations, AV populations), and forecasts of future populations.

As previously discussed, the inferences described herein can be enabled at least in part via one or more inference models 228 of part applicability module 220 of FIG. 2. Inference models 228, such as example model 310 of FIG. 3, can be trained to make inferences, given training data regarding a population of AVs and a population of parts regarding part applicability and utilization for a different population of AVs.

Figure 8:
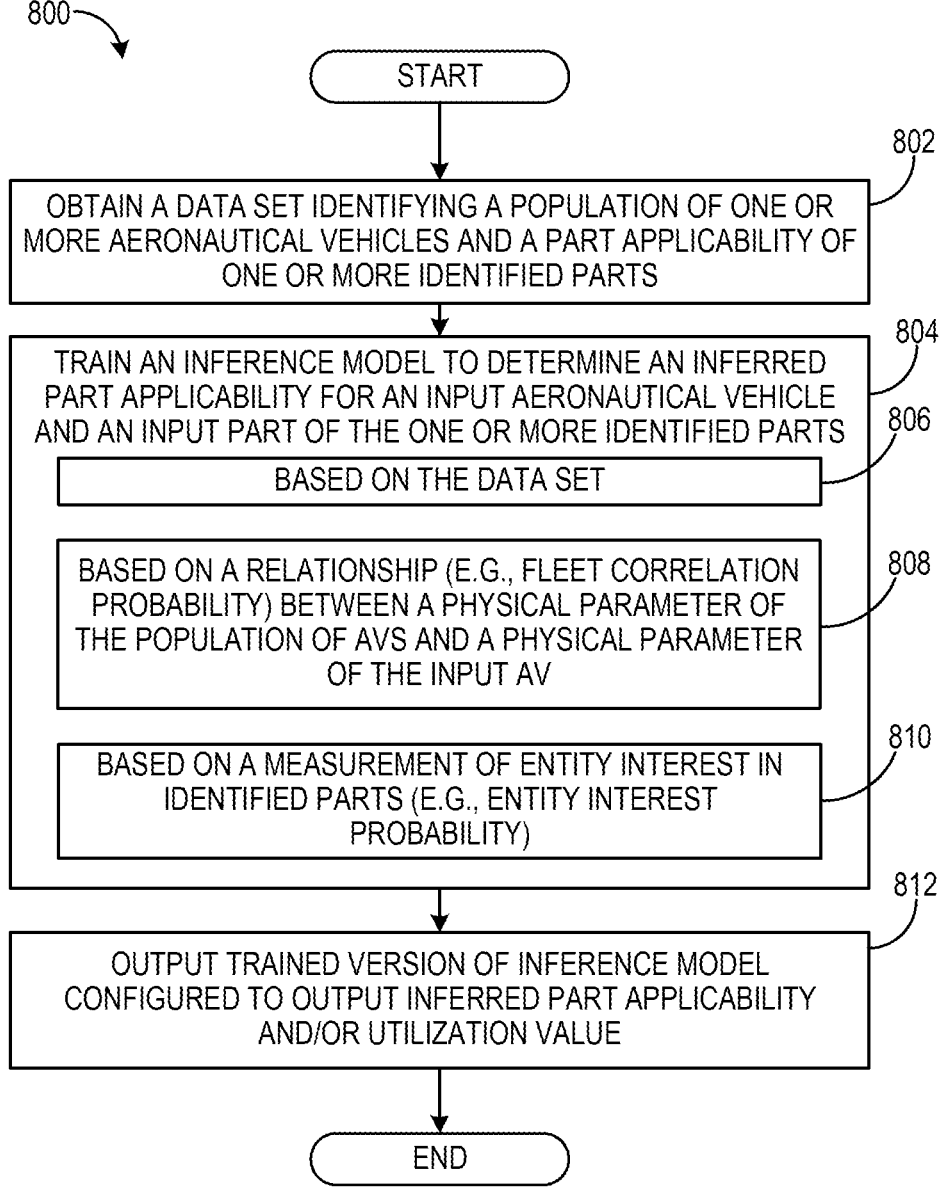
FIG. 8 is a flow diagram depicting an example method for training an inference model of FIG. 2 to determine part utilization.

FIG. 8 is a flow diagram depicting an example method 800 for training inference models 228 of part applicability module 220 to determine part applicability and utilization by AVs. As previously described with reference to FIG. 3, part applicability module 220 can include Bayesian inference model 310, as an example of interference models 228. Method 800 can be performed by computing system 200 implementing training module 222 to train inference models 228, as an example.

At 802, method 800 includes obtaining a data set identifying a population of one or more AVs and a part applicability of one or more identified parts for the population of one or more AVs. The data set can take the form of training data containing a set of known priors, such as previously described with reference to FIG. 3. These known priors can represent ground truth values used for training the inference model. For example, an entity (e.g., a manufacturer, operator, service provider, distributor, etc.) may have prior knowledge that a part is applicable or non-applicable to a particular AV configuration, which enables that part to be associated with a corresponding part applicability value within applicability data 312 of FIG. 3.

At 804, method 800 includes training the inference model to determine an inferred part applicability for an input AV configuration and an input part of the one or more identified parts of the data set obtained at 802. The inferred part applicability describes a probability that the input part is utilized by the input AV. For example, as previously described with reference to method 400 of FIGS. 4A and 4B, the inferred part applicability determined by the trained inference model can describe a probability that the input part is utilized by the AV configuration of the input AV. The AV configuration of the input AV can have a physical parameter that differs from a physical parameter the population of one or more AVs.

As part of training the inference model at 804, at 806, the inference model can be trained based on the data set obtained at 802, which includes the part applicability of one or more identified parts for the population of one or more AVs representing known priors.

As part of training the inference model at 804, at 808, the inference model can be trained based on a relationship between a physical parameter of the population of AVs and a physical parameter of the input AV. As an example, the relationship can be represented by fleet correlation probability 330 of FIG. 3.

As part of training the inference model at 804, at 810, the inference model can be further trained based on a measurement of entity interest by one or more entities in the one or more identified parts. As an example, the relationship can be represented by entity interest probability 332 of FIG. 3.

At 812, method 800 includes outputting a trained version of the inference model. The trained version of the inference model is configured to output an inferred part applicability and/or a part utilization value identifying a measurement of part utilization of the input part by the input AV. It will be understood that the inference model can be trained based on yet other types of training data, including but not limited to AV part configuration data, data obtained from a regulatory body database, data regarding quantities of AV parts in an aftermarket segment, and/or data regarding quantities of AV parts in an OEM segment, as examples.

As previously described with reference to FIG. 3, the inference model can be trained in a recursive process in which one or more priors are updated based on the measurement of entity interest in the input part, and a probability regarding a relationship between a physical parameter of the population of AVs and a physical parameter of the input AV.

An example follows in which recursive Bayesian state estimation is used to train the inference model. In this process, the probability that an identified part is utilized by an identified AV configuration (e.g., airframe) can be computed for each combination of part and airframe. In a database language, these combinations can be generated by a cross join of a set of parts and a set of AVs, for example. The training process can utilize one or more priors, which can be determined based on any suitable training data. As examples, the prior(s) can be determined based on data obtained from one or more of part configuration data sources 252, machine configuration data sources 254, regulatory body databases 256, quantity data sources 266, etc. For example, data indicating quantities of airframe populations (e.g., airframe sales) in aftermarket and OEM segments can be used.

In training the inference model, two or more probabilities can be compared to each other, with the prior(s) being updated based on the comparison. For example, the probabilities can include the fleet correlation probability 330 and the entity interest probability 332 of FIG. 3. In some examples, a measurement of interest by each entity of a set of entities in a part can be computed and correlated to the types of airframes served by those entities, to inform training of the inference model. In the case of fleet correlation probability, the probabilities can include a probability regarding a relationship between a physical parameter of a first AV configuration (e.g., those represented in training data) and a physical parameter of a second AV configuration for which the inference model is being trained. Various types of relationships between physical parameters can be considered. In some examples, a relationship can be learned between physical parameters indicating a positive correlation between a training airframe and an input airframe, which can suggest that an identified part known to be utilized by the training airframe is likely to be utilized by the input airframe. In other examples, a relationship can be learned between physical parameters indicating a negative correlation between a training airframe and an input airframe, which can suggest that an identified part known to be utilized by the training airframe is unlikely to be utilized by the input airframe. Based on the comparison of these probabilities, the priors can be updated over a plurality of epochs. In at least some examples this comparison and updating of priors can be carried out recursively until a threshold degree of convergence is achieved.

Entity interest in parts can be measured in any suitable manner. For example, entity interest can be detected based on quote requests for parts by the entity, based on detecting engagement by the entity for parts through a parts list or other user interface, and/or based on data indicating purchases or the obtaining of parts by the entity. As other examples, a provisioning list from an entity can be used to identify interest by the entity in parts included in the list.

In some examples, measurements of entity interest can be used as evidence that a part can apply to an AV configuration. Where an entity serves multiple AV configurations, the part applicability value can be used for positive expressed interest. For a lack of interest, the probability that the entity has a true lack of interest in a part can be inferred from the percent likelihood that the entity would have searched for the part given that it had interest in the part. A result of such interest measurement can be blended with a population size weighted geometric average.

In some examples, for each intersection of airframes or other suitable physical parameter that defines a machine configuration, a prior epoch applicability matrix can be converted to a correlation score. Frequentist scores can be used to compute a correlation probability, and a conditional probability can be established that a part is applicable to an input airframe given that it is or is not applicable to a training airframe. A geometric average of probabilities can be computed and used as the probability of applicability.

As previously described with reference to FIG. 3, training of the inference model can be carried out across one or more epochs. In some examples, training data can include values indicating a probability of applicability of 0 or 1. The primary epoch stage may not apply changes to such probabilities but instead treat such probabilities as hard-coded priors, and further may not set any outputs to 0 or 1. Across training epochs, probabilities of applicability not equal to 0 or 1 can be updated based on the joint probability relating to the comparison above of the probabilities regarding entity interest and fleet correlation. Further, each epoch can include recalculating entity interest probabilities and fleet correlation probabilities. In some examples, entity interest probabilities and fleet correlation probabilities can be weighted differently within merged inference matrix 336. For example, weights respectively assigned to entity interest probability and fleet correlation can be adjusted as part of training of part applicability module 220, through programmatically implemented adjustment (e.g., by training module 222) and/or through human implemented adjustment (e.g., by subject matter experts as an example of user input 268).

In some examples, known priors can be delisted—for example, at every fifth epoch. This can include delisting one part and a low percentage (e.g., 1%) of known priors. Such delisting can be performed for parts for which entity interest probabilities and fleet correlation probabilities deviate significantly away from 1. Further, in some examples, uplisting can be performed (e.g., every fifth epoch) for records with high probability.

In view of the above, inference models 228 of FIG. 2 can be trained to make accurate inferences about part utilization for one AV population, for which part utilization is known or knowledge thereof is incomplete, based on knowledge of part utilization for a different AV population that differs in physical configuration from the first AV population. Other types of mappings are possible from one population for which there is greater knowledge to another population for which there is relatively lesser knowledge and that differs in physical configuration from the first population in one or more manners. As another potential application of inference models 228, inferences can be in the presence of changes in part configuration or part number, including where knowledge of such changes is not possessed.

The inferences and determinations described herein regarding part utilization, part applicability, and other described techniques can apply to aeronautical vehicles other than aircraft. The described techniques can further apply to vehicle types other than aeronautical vehicles, such as land and water vehicles. In such examples, the described techniques can be adapted to such alternative vehicle types. For examples in which population modeling or forecasting occurs, vehicle operating hours can be used in lieu of flight hours, and engine horsepower or other measured output can be used in lieu of engine thrust. Further, the described techniques can be applied to machine types other than vehicles. In such examples, a first data set can be obtained identifying a physical parameter of a first population of machines and a part applicability of an identified part for the first population of machines, and a second data set can be obtained identifying a physical parameter of a second population of machines that includes a different machine type from the first population of machines. Then, an inferred part applicability can be determined for the second population of machines that describes a probability that the identified part is utilized by the second population of machines, wherein the inferred part applicability is probabilistically inferred based, at least in part, on the part applicability and a relationship between the physical parameter of the first population and the physical parameter of the second population. A part utilization value can be provided identifying a measurement of part utilization of the identified part by the second population of machines that is based, at least in part, on the inferred part applicability.

Referring again to FIG. 2, part categorization module 214 can be used to categorize the parts into part categories. As an example, part categorization module 214 can include a classification models 230 (e.g., a trained classifier) to categorize parts into part categories.

Within the context of AVs, example part categories can include chemical (e.g., fuels, oils, other lubricants, etc.), fasteners (e.g., bolts, screws, rivets, mechanical connectors, plugs, caps, collars, hoses, seals, rings, grommets, bushings, etc.), hardware, specialty, electrical (e.g., wiring, fuses, diodes, relays, integrated circuits, etc.), industry, and other components. It will be understood that other part categories can be used that are suitable to the particular category of machine.

In at least some examples, part categorization module 214 can categorize parts into part categories based on a part code associated with each part. Examples of part codes include HS codes of the Harmonized Commodity Description and Coding System, HTS codes of the Harmonized Tariff Schedule, or other suitable part code that may be associated with parts of a given category of machine.

Part categorization module 214 can cluster parts that exhibit similarity in classification, and potentially based on other criteria—for example, by part number, based on identifying part groups that exhibit independent sales characteristics (e.g., exhibiting relatively independent purchasing and competitive behavior). Further, part categorization module 214 can categorize any suitable types of AV parts, including proprietary and/or non-proprietary parts. In some examples, part categorization module 214 can categorize AV parts that do not have associated classifications; in such examples, a classifier implemented by computing system 200 (e.g., a logistic classifier) can assign such parts to a nearest product category.

In some examples, computing system 200 can convert, or otherwise establish relationships between, part categories to product lines. In one example process, populations of proprietary parts and/or entities associated with proprietary parts can first be withheld in the conversion process, with remaining values being converted based on historical sales correlations between a target product line and part categories. Sales data—historical and otherwise—can be obtained via quantity data source 266, for example. Where such conversion is carried out, part category correlation can be established via K-means clustering, for example. In this approach, the Euclidean distance can be computed from a set of assumed priors, as an example. As a more particular example, distance can be computed based on a class code correlation between a part classification (e.g., HTS code) and the priors, and also based on a product line correlation between the part classification and the priors. In some examples, class codes that exhibit greater than a threshold degree of matching sales, by class code in both directions, can be merged prior to part categorization to reduce degrees of freedom and pool values for informational gain.

A population of airframes can be modeled by population modeling module 216 for a particular domain (e.g., geographic region—country, continent, global, etc.). The population modeling module 216 can include population models 232 which can take the form of a power function, in at least some examples.

For example, a total global airframe population can be modeled (e.g., in terms of airline cost and/or other measures) via a power function of population models 232. The power function can be used to model an airframe population as a function of time, and thus can provide measurements of past or historical airframe populations, current airframe populations, and/or future airframe populations. Alternatively or additionally, the population model can model other aspects associated with airframe populations, such as associated airline cost, airframe operating cost, and/or airframe demand.

The power function, as an example, can take the form: $Y^{\alpha}*H*W^{\beta}*D*A*e^{(R*t)}$, where Y is an airframe age term (e.g., years), H is a flight hours term, W is an AV weight term (e.g., an operating empty mass or weight), D is a term that can be used to parse the power function based upon various entity segments (e.g., 140 of FIG. 1), A is a term that can be used to parse the power function based on various parts or part categories (e.g., 328 of FIG. 3), R is a pricing term that can incorporate a compound annual growth rate (CAGR), and t is an input variable representing time (e.g., time in years measured since a start date at which training of the power function began).

In at least some examples, one or more terms of the power function can incorporate transforms to accommodate variations in the model. As an example, the Y term can include a transform to accommodate outliers and exhibit desired behavior with respect to cost (e.g., lower cost in the earlier years of lifecycle, higher cost toward the end of lifecycle, and an approximately linear change within a middle age range). For example, a transformed version Y' of Y can be computed as $\tan(a*(Y-b))+c$, where a, b, and c are constants, and Y is a non-transformed version of the term. In this example, the Y' transform accounts for greater maintenance toward end of life, and lower maintenance toward early life. As another example, the H term can incorporate a transform to adjust for routes with higher cycle rates. For example, a transformed version H' of H can be computed as $(d+\ln(H))/e$, where d and e are constants, H is a non-transformed version of the term, and ln is the natural logarithm.

In some examples, part utilization and/or other determinations made by computing system 200 can be informed by knowledge regarding an overall population of AVs and/or AV parts. For example, given data regarding a subset of a total population of all AV parts of a common type (e.g., all existing airframes, all existing AV engines), the total population of all AV parts of that type can be modeled and used to inform other determinations by computing system 200. A total population that is modeled can include a global population of AV parts, for example. Populations can be modeled in terms of any suitable parameters, including but not limited to population number and/or other quantifications of population, demand, cost, utilization (e.g., consumption rate), customer volume, customer demand, vendor volume, and/or vendor supply (e.g., delivery rate/delivery volume).

The constants and exponent terms in the power function described above can be learned in a training process. Training module 222, for example, can be used to enact the training process for the power function. Training module 222 can utilize any suitable training data obtained via data provisioning module 218, and can use any suitable optimization techniques (e.g., gradient descent) as part of training. As examples, the A and R terms of the power function can be learned at least in part using training module 222 based on quantity data (e.g., obtained from quantity data source 266) describing historical sales of airframes. Other terms of the power function, such as D, can be trained based on data regarding airlines, such as form 41 reports obtained via analytics service 262. Such airline-related data can include information regarding one or more of shipments, billings, deliveries, statistical data, safety data, balance sheets, cash flow, employment, income, fuel cost, fuel consumption, and operating expenses. In some examples, airline-related data and potentially other data types can be aggregated—e.g., at a quarterly airline level—and provided as training data to training module 222. Further, training of the power function can include, in some examples, applying outlier analysis—e.g., to AV populations including both larger and smaller aircraft or airframe sizes. The power function can be validated against block hour cost and/or any other suitable criteria.

As another example of population modeling, population modeling module 216 can model a population of AV engines such as a total global population of AV engines or other regionality. In this example, the engine population is modeled via a power function of the form: $Y^\theta * H^\epsilon * T^\gamma * D * A * e^{(R*t)}$. Y is an AV age term, H is a flight hours term, T is an engine thrust term, D is a term that can be used to parse the power function based upon various entity segments (e.g., 140 of FIG. 1), A is a term that can be used to parse the power function based on various parts or part categories (e.g., 328 of FIG. 3), R is a pricing CGAR term, and t is an input variable representing time.

This engine power function can provide a population model that models an engine population as a function of time, and thus can provide measurements of past or historical engine populations, current engine populations, and/or future engine populations. As described above with reference to the airframe power function, Y and/or H can include a transform in some examples. Further, constants and exponent terms in the engine power function can be learned in a training process implemented via training module 222, in which any suitable training data obtained via data provisioning module 218 can be used.

Other types of population modeling that can be implemented by population modeling module 216 including modeling a population of entities associated with an AV parts supply chain. A population of customers of AV parts can be modeled, as one example. Entity population modeling can be performed to measure the extent or portion to which a demand—e.g., for one or more AV parts, AV part categories, and/or AVs; demand in an aftermarket segment versus an OEM segment—exists or is expected to exist in the future, or the extent to which the demand is currently satisfied or is expected to be satisfied in the future (e.g., by parts vendors identified in computing system 200 that provide parts satisfying such demand). Where unsatisfied demand is recognized, population modeling module 216 can help identify opportunities for AV parts vendors and other entities to address such unsatisfied demand. Substantially full satisfaction of demand, or saturation, can similarly be detected. Further, demand, and/or extent to which demand is satisfied, can be measured on a per-entity basis.

In examples in which a population of entities associated with AV parts is modeled, quantity-related data (e.g., obtained from quantity data source 266) can be used to model the entity population. The quantity-related data can include data regarding sales of AV parts, for example. Sales data or other quantity-related data can be associated with individual entities, such as airlines and maintenance, repair, and operations (MRO) entities, as examples. Further, quantity-related data can include per-regionality data (e.g., by country, global) and/or per-population-segment data.

In modeling a population, population modeling module 216 can fit model(s) such as logistic S-curve regression to the population—e.g., based on the quantity-related data and/or other data. In this fitting process, a parameter K such as a logistic growth rate can be determined regarding the population. Aspects of populations, such as population quantity and time-based utilization rates of AV parts by populations, can be forecasted in time using the growth rate. As a particular example, population modeling module 216 can apply a logistic fit to a population segment—e.g., a segment represented by a descending sorted population ratio curve for customers or other entities in the population segment. A ratio can be computed based on part quantity data (e.g., measured part sales quantity in a part category) divided by a measure of the portion of a part population that is served by entities. Respective portions of the population served by each entity can be computed—e.g., based on a linear regression of a cumulative distribution function (CDF) for sales against the CDF for total AV part population. This quantity can be used in supplier inventory analysis and to help discover longer-term trends associated with entities that purchase AV parts.

In some examples, population modeling module 216 can determine population models 232, such as population models encoded by the power functions described above, for different population segments. As one example, separate models of populations of AV parts—and/or associated demand, satisfaction of demand, or other measurements—can be determined for an aftermarket segment and for an OEM segment, respectively. Unsatisfied demand can be recognized in some examples, and thus be identified as being potentially addressable by an entity.

As a particular example, an addressable or unsatisfied portion of demand (e.g., part utilization or other measure of part consumption) for AV parts in an OEM or other segment can be modeled via population modeling module 216. In this segment, AV parts can include parts provided by a vendor, and potentially also related parts (e.g., parts that can be substituted for corresponding parts provided by the vendor). In this example, a ratio can be computed from a K parameter (e.g., logistic growth rate) derived from modeling performed by population modeling module 216 described above—e.g., per-entity measured sales quantities, portion of a total AV part population that is served. Then, one or more highest saturation entities can be identified, and an addressable portion of demand can be extrapolated by inferring that all entities can consume parts up to this saturation level. The saturation level can be used to define addressable scales for part categories. An addressable scale can be used as the A term in the functions described above, for example. Finally, the addressable portion of demand in the OEM or other segment can be computed as K*A, where K is the K parameter described above, and A is an addressable scale term. While this example is described with reference to an OEM segment, it will be understood that population modeling can be performed in an aftermarket segment. In some examples, population modeling in both OEM and aftermarket segments can be combined to model a total AV parts population including OEM and aftermarket segments. Such modeling can include measuring a size of a total AV parts population, for example.

The population modeling described herein can include inferences about aspects of populations where such aspects are not known. This can enable accurate extrapolation, from one population for which there is known configuration information, to another population for which there is unknown configuration information. For example, information regarding one population segment such as an aftermarket segment, can be used to extrapolate to another population segment such as an OEM segment. As another example, information regarding one or more population segments can be used to extrapolate to a total population that includes the individual segment(s). As another example, information regarding a first population comprising one or more airframe types can be used to extrapolate to a second population comprising one or more other airframe types that differ from the airframe types in the first population. As another example, information regarding a first population comprising AVs provided by a first set of manufacturers can be used to extrapolate to a second population comprising AVs provided by a second set of different manufacturers. Yet other types of extrapolation can be performed from a first population that includes AVs having a first physical parameter, to a second population that includes AVs having a second physical parameter differing from the first physical parameter. Example physical parameters that can differ between populations include but are not limited to engine weight, engine thrust, AV weight, and other parameters of AV configurations.

It will be understood that data sources 250 can include data determined by modules of instructions 212 of computing system 200. For example, missing values in input data 242 obtained from data sources 250 can be inferred via computing system 200 to obtain processed data 244. As another example, forecasts of future quantities can be inferred by computing system 200.

Figure 9:
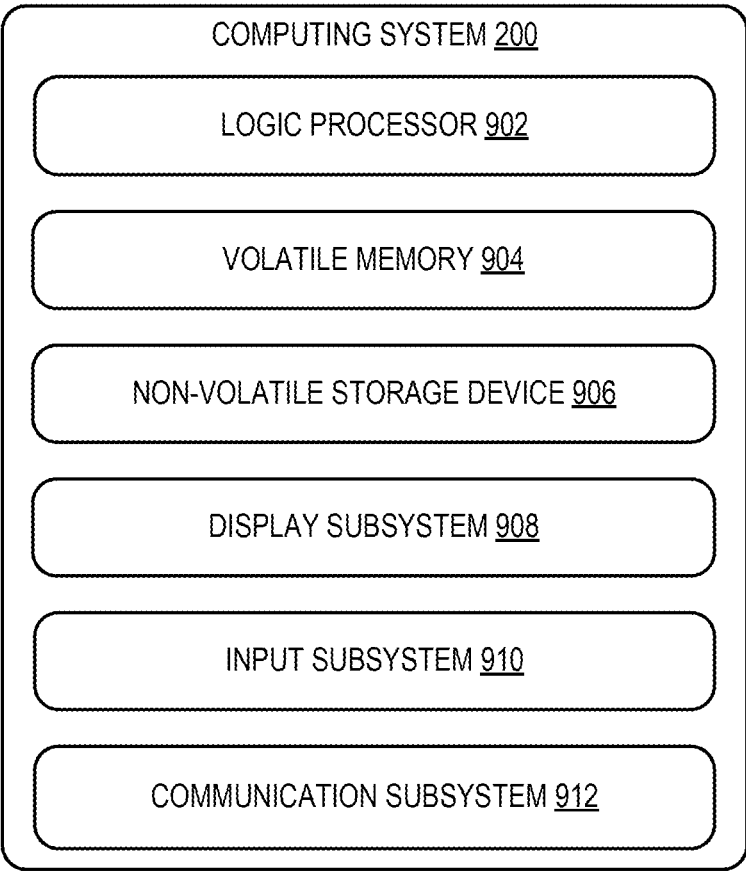
FIG. 9 schematically depicts additional aspects of the computing system of FIG. 2.

FIG. 9 schematically depicts additional aspects of computing system 200 of FIG. 2. Computing system 200 includes a logic processor 902, volatile memory 904, and a non-volatile storage device 906. Computing system 200 can optionally include a display subsystem 908, input subsystem 910, communication subsystem 912 connected to a computer network, and/or other components not shown in FIG. 9. These components are typically connected for data exchange by one or more data buses when integrated into single computing device, or by a combination of data buses, network data interfaces, and computer networks when integrated into separate computing devices connected by computer networks.

The non-volatile storage device 906 stores various instructions (e.g., instructions 212 of FIG. 2) that are executed by the logic processor 902, as well as other forms of data (e.g., data 240 of FIG. 2). Logic processor 902 includes one or more physical devices configured to execute the instructions. For example, the logic processor 902 can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor 902 can include one or more physical processors (hardware) configured to execute software instructions. Additionally or alternatively, the logic processor 902 can include one or more hardware logic circuits or firmware devices configured to execute hardware-implemented logic or firmware instructions. Processors of the logic processor 902 can be single-core or multi-core, and the instructions executed thereon can be configured for sequential, parallel, and/or distributed processing. Individual components of the logic processor 902 optionally can be distributed among two or more separate devices (e.g., host computing devices 210 and/or client computing devices 214 of FIG. 2), which can be remotely located and/or configured for coordinated processing. Aspects of the logic processor 902 can be virtualized and executed by remotely accessible, networked computing devices configured in a cloud-computing configuration. In such a case, these virtualized aspects are run on different physical logic processors of various different machines.

Non-volatile storage device 906 includes one or more physical devices configured to hold instructions executable by the logic processors to implement the methods and processes described herein. When such methods and processes are implemented, the state of non-volatile storage device 906 can be transformed—e.g., to hold different data.

Non-volatile storage device 906 can include physical devices that are removable and/or built-in. Non-volatile storage device 906 can include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 can include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 can include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe components of instructions executed by a processor to perform a particular function using portions of volatile memory, which involves transformative processing that specially configures the processor to perform the function. Thus, a module, program, or engine can be instantiated via logic processor 902 executing instructions held by non-volatile storage device 906, using portions of volatile memory 904. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

Display subsystem 908 typically includes one or more displays, which can be physically integrated with or remotely located from a device that houses the logic processor 902. Graphical output of the logic processor executing the instructions described above, such as a graphical user interface, is configured to be displayed via display subsystem 908.

Input subsystem 910 typically includes one or more input devices such as a keyboard, pointing device (e.g., mouse, trackpad, finger operated pointer), touchscreen, microphone, and camera. Other input devices can also be provided.

Communication subsystem 912 is configured to communicatively couple various computing devices described herein with each other, and with other devices. Communication subsystem 912 can include wired and/or wireless communication devices compatible with one or more different communication protocols. As examples, the communication subsystem can be configured for communication via a wireless telephone network, or a wired or wireless local- or wide-area network by devices such as a 3G, 4G, 5G, or 6G radio, WIFI card, ethernet network interface card, BLUETOOTH radio, etc. In some embodiments, the communication subsystem can allow computing system 200 to send and/or receive messages to and/or from other devices via a network such as the Internet. It will be appreciated that one or more of the computer networks via which communication subsystem 912 is configured to communicate can include security measures such as user identification and authentication, access control, malware detection, enforced encryption, content filtering, etc., and can be coupled to a wide area network (WAN) such as the Internet.

The present disclosure comprises configurations according to the following clauses.

Clause 1. A method performed by a computing system for determining part utilization by aeronautical vehicles, the method comprising: obtaining a first data set identifying a physical parameter defining a configuration of a first population of one or more aeronautical vehicles and a part applicability of an identified part for the first population; obtaining a second data set identifying a physical parameter defining a configuration of a second population of one or more aeronautical vehicles that differs from the physical parameter of the first population; determining an inferred part applicability for the second population of one or more aeronautical vehicles that describes a probability that the identified part is utilized by the second population, wherein the inferred part applicability is probabilistically inferred by the computing system based, at least in part, on the part applicability and a relationship between the physical parameter of the first population and the physical parameter of the second population; and outputting a part utilization value identifying a measurement of part utilization of the identified part for the second population of aeronautical vehicles that is based, at least in part, on the inferred part applicability.

Clause 2. The method of Clause 1, wherein the probability that the identified part is utilized by the second population of aeronautical vehicles is determined recursively based on a comparison of the relationship between the physical parameter of the first population of aeronautical vehicles and the physical parameter of the second population of aeronautical vehicles, and further based on a measurement of entity interest in the identified part.

Clause 3. The method of any of Clauses 1-2, wherein the part utilization value identifies the probability that the identified part is utilized by the second population of aeronautical vehicles.

Clause 4. The method of any of Clauses 1-3, wherein the second data set further identifies a quantity of the second population of aeronautical vehicles; wherein the part utilization value is further based, at least in part, on the quantity of the second population of aeronautical vehicles; and wherein the part utilization value identifies a quantity of the identified part currently utilized by the second population of aeronautical vehicles.

Clause 5. The method of any of Clauses 1-4, wherein the second data set further identifies a quantity of the second population of aeronautical vehicles and an age of each aeronautical vehicle of the second population of aeronautical vehicles; wherein the part utilization value is further based, at least in part, on the quantity of the second population of aeronautical vehicles and the age of each aeronautical vehicle of the second population of aeronautical vehicles; and wherein the part utilization value identifies a time-based utilization rate of the identified part utilized by the second population of aeronautical vehicles.

Clause 6. The method of Clause 5, wherein the identified part is associated with a duration of time defining a part lifecycle of the identified part; and wherein the second data set further identifies a time-based utilization rate of the second population of aeronautical vehicles; wherein the part utilization value is further based, at least in part, on the duration of time associated with the identified part and the time-based utilization rate of the second population of aeronautical vehicles.

Clause 7. The method of any of Clauses 1-6, wherein the physical parameter of the first population of aeronautical vehicles includes a first airframe type; and wherein the physical parameter of the second population of aeronautical vehicles includes a second airframe type that differs from the first airframe type.

Clause 8. The method of any of Clauses 1-7, wherein the physical parameter of the first population of aeronautical vehicles includes a first engine type;

wherein the physical parameter of the second population of aeronautical vehicles includes a second engine type that differs from the first engine type.

Clause 9. The method of any of Clauses 1-8, wherein the physical parameter of the first population of aeronautical vehicles includes a first weight or thrust value of a sample aeronautical vehicle of the first population of aeronautical vehicles; wherein the physical parameter of the second population of aeronautical vehicles includes a second weight or thrust value of a sample aeronautical vehicle of the second population of aeronautical vehicles.

Clause 10. The method of any of Clauses 1-9, wherein the first population of aeronautical vehicles is manufactured by a first manufacturer, and wherein the second population of aeronautical vehicles is manufactured by a second manufacturer different from the first manufacturer.

Clause 11. The method of any of Clauses 1-10, wherein the part utilization value further identifies a forecast of future part utilization of the identified part by the second population of aeronautical vehicles.

Clause 12. The method of any of Clauses 1-11, wherein the identified part is one of a plurality of identified parts, the method further comprising categorizing each identified part of the plurality of identified parts into one or more part categories.

Clause 13. The method of Clause 12, further comprising, determining a forecast of future part utilization for each of the one or more part categories.

Clause 14. The method of any of Clauses 1-13, further comprising, outputting a list of one or more identified parts for each of which a respective probability is inferred, meeting or exceeding a threshold probability, that the identified part is utilized by the second population of aeronautical vehicles.

Clause 15. A method performed by a computing system for training an inference model to determine part utilization by aeronautical vehicles, the method comprising: obtaining a data set identifying a population of one or more aeronautical vehicles and a part applicability of one or more identified parts for the population of one or more aeronautical vehicles; based, at least in part on the data set, training the inference model to determine an inferred part applicability for an input aeronautical vehicle and an input part of the one or more identified parts, wherein the inferred part applicability describes a probability that the input part is utilized by the input aeronautical vehicle; and outputting a trained version of the inference model, the trained version of the inference model being configured to output a part utilization value identifying a measurement of part utilization of the input part by the input aeronautical vehicle that is based, at least in part, on the inferred part applicability.

Clause 16. The method of Clause 15, wherein the inference model is trained based further on a measurement of interest by one or more entities in the one or more identified parts.

Clause 17. The method of any of Clauses 15-16, wherein the inference model is trained in a recursive process in which one or more priors are updated based on a measurement of entity interest in the input part, and a probability regarding a relationship between a physical parameter of the population of aeronautical vehicles and a physical parameter of the input aeronautical vehicle.

Clause 18. The method of any of Clauses 15-17, wherein the inference model is trained based further on one or more of aeronautical vehicle part configuration data, data obtained from a regulatory body database, data regarding quantities of aeronautical vehicle parts in an aftermarket segment, and data regarding quantities of aeronautical vehicle parts in an original manufacture segment.

Clause 19. The method of any of Clauses 15-18, wherein the inference model is trained using recursive Bayesian state estimation.

Clause 20. A computing system, comprising: one or more processors; and one or more storage devices comprising instructions executable by the one or more processors to: obtain a first data set identifying a physical parameter defining a configuration of a first population of one or more aeronautical vehicles and a part applicability of an identified part for the first population; obtain a second data set identifying a physical parameter defining a configuration of a second population of one or more aeronautical vehicles that differs from the physical parameter of the first population; determine an inferred part applicability for the second population of one or more aeronautical vehicles that describes a probability that the identified part is utilized by the second population, wherein the inferred part applicability is probabilistically inferred by the computing system based, at least in part, on the part applicability and a relationship between the physical parameter of the first population and the physical parameter of the second population; and output a part utilization value identifying a measurement of part utilization of the identified part for the second population of aeronautical vehicles that is based, at least in part, on the inferred part applicability.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computing system for determining part utilization by aeronautical vehicles, the method comprising:

obtaining a first data set identifying a first physical parameter defining a first configuration of a first population of one or more aeronautical vehicles and a part applicability of an identified part for the first population as a known training prior;

obtaining a second data set identifying a second physical parameter defining a second configuration of a second population of one or more aeronautical vehicles that differs from the first physical parameter of the first population;

obtaining a third data set identifying a measure of entity interest in the identified part for one or more entities attributed to the second configuration of one or more aeronautical vehicles;

determining, via an inference model executed by the computing system, an inferred part applicability for the second population of one or more aeronautical vehicles that describes a probability that the identified part is utilized by the second population, wherein the inferred part applicability is probabilistically inferred by the inference model based, at least in part, on the part applicability, a relationship between the first physical parameter of the first population and the second physical parameter of the second population, and the measure of entity interest; and outputting a part utilization value identifying a measurement of part utilization of the identified part for the second population of aeronautical vehicles that is based, at least in part, on the inferred part applicability;

wherein the inferred part applicability is determined by the inference model recursively over a plurality of epochs of a recursive process by, for each epoch:

determining an epoch-specific correlation probability representing the relationship between the first physical parameter and the second physical parameter for the identified part, determining an epoch-specific entity interest probability for the identified part based on the measure of entity interest, determining an epoch-specific inferred part applicability for the epoch based on the part applicability of the identified part, the epoch-specific correlation probability, and the epoch-specific entity interest probability, and upon the epoch-specific inferred part applicability of the epoch reaching a threshold degree of convergence with the epoch-specific inferred part applicability of one or more prior epochs of the plurality of epochs, outputting the inferred part applicability for the recursive process.

2. The method of claim 1, wherein the part utilization value identifies the probability that the identified part is utilized by the second population of aeronautical vehicles.

3. The method of claim 1, wherein the second data set further identifies a quantity of the second population of aeronautical vehicles;

wherein the part utilization value is further based, at least in part, on the quantity of the second population of aeronautical vehicles; and wherein the part utilization value identifies a quantity of the identified part currently utilized by the second population of aeronautical vehicles.

4. The method of claim 1, wherein the second data set further identifies a quantity of the second population of aeronautical vehicles and an age of each aeronautical vehicle of the second population of aeronautical vehicles;

wherein the part utilization value is further based, at least in part, on the quantity of the second population of aeronautical vehicles and the age of each aeronautical vehicle of the second population of aeronautical vehicles; and wherein the part utilization value identifies a time-based utilization rate of the identified part utilized by the second population of aeronautical vehicles.

5. The method of claim 4, wherein the identified part is associated with a duration of time defining a part lifecycle of the identified part; and wherein the second data set further identifies a time-based utilization rate of the second population of aeronautical vehicles;

wherein the part utilization value is further based, at least in part, on the duration of time associated with the identified part and the time-based utilization rate of the second population of aeronautical vehicles.

6. The method of claim 1, wherein the first physical parameter of the first population of aeronautical vehicles includes a first airframe type; and wherein the second physical parameter of the second population of aeronautical vehicles includes a second airframe type that differs from the first airframe type.

7. The method of claim 1, wherein the first physical parameter of the first population of aeronautical vehicles includes a first engine type;

wherein the second physical parameter of the second population of aeronautical vehicles includes a second engine type that differs from the first engine type.

8. The method of claim 1, wherein the first physical parameter of the first population of aeronautical vehicles includes a first weight or thrust value of a sample aeronautical vehicle of the first population of aeronautical vehicles;

wherein the second physical parameter of the second population of aeronautical vehicles includes a second weight or thrust value of a sample aeronautical vehicle of the second population of aeronautical vehicles.

9. The method of claim 1, wherein the first population of aeronautical vehicles is manufactured by a first manufacturer, and wherein the second population of aeronautical vehicles is manufactured by a second manufacturer different from the first manufacturer.

10. The method of claim 1, wherein the part utilization value further identifies a forecast of future part utilization of the identified part by the second population of aeronautical vehicles.

11. The method of claim 1, wherein the identified part is one of a plurality of identified parts, the method further comprising categorizing each identified part of the plurality of identified parts into one or more part categories.

12. The method of claim 11, further comprising, determining a forecast of future part utilization for each of the one or more part categories.

13. The method of claim 1, further comprising, outputting a list of one or more identified parts for each of which a respective probability is inferred, meeting or exceeding a threshold probability, that the identified part is utilized by the second population of aeronautical vehicles.

14. The method of claim 1, wherein the epoch-specific correlation probability takes a form of a first inference matrix along with one or more other epoch-specific correlation probabilities of one or more other parts;

wherein the epoch-specific entity interest probability takes a form of a second inference matrix along with one or more other epoch-specific entity interest probabilities of the one or more other parts;

wherein the recursive process is performed for each part of the one or more other parts; and wherein determining the epoch-specific inferred part applicability for the epoch includes merging the first inference matrix and the second inference matrix to obtain a merged inference matrix.

15. A computing system, comprising:

one or more processors; and one or more storage devices comprising instructions executable by the one or more processors to:

obtain a first data set identifying a first physical parameter defining a first configuration of a first population of one or more aeronautical vehicles and a part applicability of an identified part for the first population as a known training prior;

obtain a second data set identifying a second physical parameter defining a second configuration of a second population of one or more aeronautical vehicles that differs from the first physical parameter of the first population;

obtain a third data set identifying a measure of entity interest in the identified part for one or more entities attributed to the second configuration of one or more aeronautical vehicles;

determine, via an inference model of the instructions executable by the one or more processors, an inferred part applicability for the second population of one or more aeronautical vehicles that describes a probability that the identified part is utilized by the second population, wherein the inferred part applicability is probabilistically inferred by the inference model based, at least in part, on the part applicability, a relationship between the first physical parameter of the first population and the second physical parameter of the second population, and the measure of entity interest; and output a part utilization value identifying a measurement of part utilization of the identified part for the second population of aeronautical vehicles that is based, at least in part, on the inferred part applicability;

wherein the inferred part applicability is determined by the inference model recursively over a plurality of epochs of a recursive process by, for each epoch:

determining an epoch-specific correlation probability representing the relationship between the first physical parameter and the second physical parameter for the identified part, determining an epoch-specific entity interest probability for the identified part based on the measure of entity interest, determining an epoch-specific inferred part applicability for the epoch based on the part applicability of the identified part, the epoch-specific correlation probability, and the epoch-specific entity interest probability, and upon the epoch-specific inferred part applicability of the epoch reaching a threshold degree of convergence with the epoch-specific inferred part applicability of one or more prior epochs of the plurality of epochs, outputting the inferred part applicability for the recursive process.

16. The computing system of claim 15, wherein the part utilization value identifies the probability that the identified part is utilized by the second population of aeronautical vehicles.

17. The computing system of claim 15, wherein the second data set further identifies a quantity of the second population of aeronautical vehicles;

wherein the part utilization value is further based, at least in part, on the quantity of the second population of aeronautical vehicles; and wherein the part utilization value identifies a quantity of the identified part currently utilized by the second population of aeronautical vehicles.

18. The computing system of claim 15, wherein the second data set further identifies a quantity of the second population of aeronautical vehicles and an age of each aeronautical vehicle of the second population of aeronautical vehicles;

wherein the part utilization value is further based, at least in part, on the quantity of the second population of aeronautical vehicles and the age of each aeronautical vehicle of the second population of aeronautical vehicles; and wherein the part utilization value identifies a time-based utilization rate of the identified part utilized by the second population of aeronautical vehicles.

19. The computing system of claim 15, wherein the identified part is associated with a duration of time defining a part lifecycle of the identified part; and wherein the second data set further identifies a time-based utilization rate of the second population of aeronautical vehicles;

wherein the part utilization value is further based, at least in part, on the duration of time associated with the identified part and the time-based utilization rate of the second population of aeronautical vehicles.

20. The computing system of claim 15, wherein the epoch-specific correlation probability takes a form of a first inference matrix along with one or more other epoch-specific correlation probabilities of one or more other parts;

wherein the epoch-specific entity interest probability takes a form of a second inference matrix along with one or more other epoch-specific entity interest probabilities of the one or more other parts;

wherein the recursive process is performed for each part of the one or more other parts; and wherein determining the epoch-specific inferred part applicability for the epoch includes merging the first inference matrix and the second inference matrix to obtain a merged inference matrix.

* * * * *